United States Patent
Itoh et al.

(10) Patent No.: US 7,287,636 B2
(45) Date of Patent: Oct. 30, 2007

(54) DRIVING DEVICE AND DIVERTER, DIVERTING UNIT, AND CONVEYING APPARATUS INCORPORATING THE DRIVING DEVICE

(75) Inventors: Kazuo Itoh, Kasai (JP); Yoshikazu Nishida, Neyagawa (JP); Masaki Tanaka, Himeji (JP)

(73) Assignee: Itoh Denki Co., Ltd. (JP)

( * ) Notice: Subject to any disclaimer, the term of this patent is extended or adjusted under 35 U.S.C. 154(b) by 296 days.

(21) Appl. No.: 11/167,045

(22) Filed: Jun. 24, 2005

(65) Prior Publication Data
US 2006/0025266 A1   Feb. 2, 2006

(30) Foreign Application Priority Data
Jul. 30, 2004   (JP)  ............................. 2004-224412
Jul. 30, 2004   (JP)  ............................. 2004-224413

(51) Int. Cl.
*B65G 47/46* (2006.01)
(52) U.S. Cl. ............... 198/370.1; 198/463.3; 198/809
(58) Field of Classification Search ............. 198/370.1, 198/463.3, 809
See application file for complete search history.

(56) References Cited

U.S. PATENT DOCUMENTS

| | | | | |
|---|---|---|---|---|
| 4,730,718 A | * | 3/1988 | Fazio et al. ............... | 198/370.1 |
| 4,926,999 A | * | 5/1990 | Fauth et al. ................ | 198/358 |
| 4,962,841 A | * | 10/1990 | Kloosterhouse ......... | 198/370.09 |
| 5,609,236 A | * | 3/1997 | Neukam ................... | 198/370.1 |
| 5,743,375 A | * | 4/1998 | Shyr et al. ................ | 198/463.3 |
| 5,971,132 A | * | 10/1999 | Bonnet .................... | 198/370.07 |
| 2003/0168320 A1 | | 9/2003 | Itoh et al. | |

FOREIGN PATENT DOCUMENTS

| | | |
|---|---|---|
| JP | 2003081421 | 3/2003 |
| JP | 2003261219 | 9/2003 |
| JP | 2003285925 | 10/2003 |

* cited by examiner

*Primary Examiner*—Mark A Deuble
(74) *Attorney, Agent, or Firm*—Wood, Phillips, Katz, Clark and Mortimer

(57) ABSTRACT

A conveying apparatus 100 includes a main conveyor line 101 formed by a motorized roller 110 and a free roller 111 arranged at specified intervals and a diverting line 102 for diverting an article from the main conveyor line 101. The diverting line 102 has a diverting unit 103 with a pair of a diverter 160 integrated on a frame 141.

A driving device 1 for operating the diverter 160 is arranged with casings 3, 5 provided at both sides of a main roller 2. The main roller 2 accommodates a motor 11 and first planetary gear mechanisms 12, 13 in a hollow cylinder 10. The casings 3, 5 each accommodate a second planetary gear mechanism 70 in a cylindrical casing 71. The first planetary gear mechanism 12, 13 each form a planetary type on the condition that an eccentric member 74 is rotatable, and form a star type on the condition that the eccentric member 74 is unrotatable, thereby switching lifting operation of the diverter 160 and transverse conveying operation of an article by means of belts 170, 170.

24 Claims, 16 Drawing Sheets

FIG. 15A
FIG. 15B
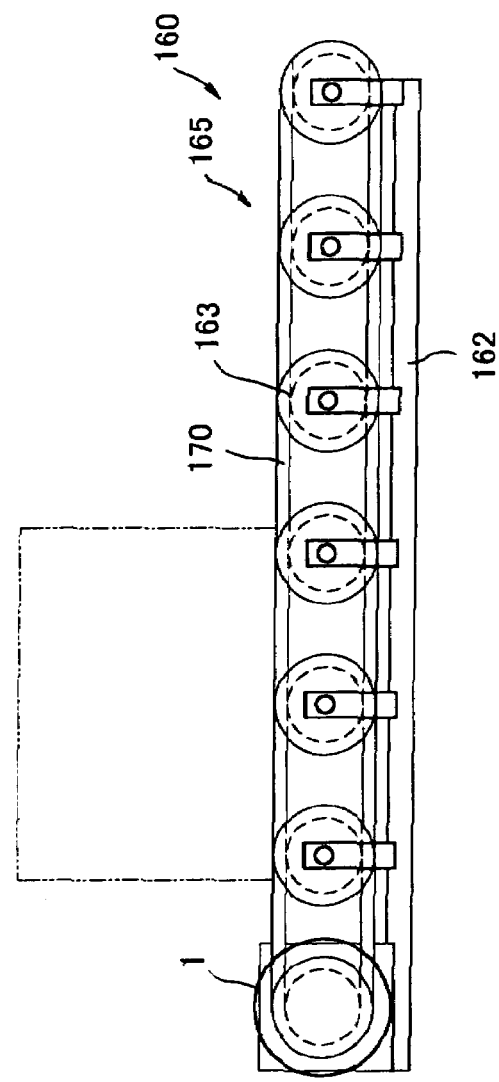
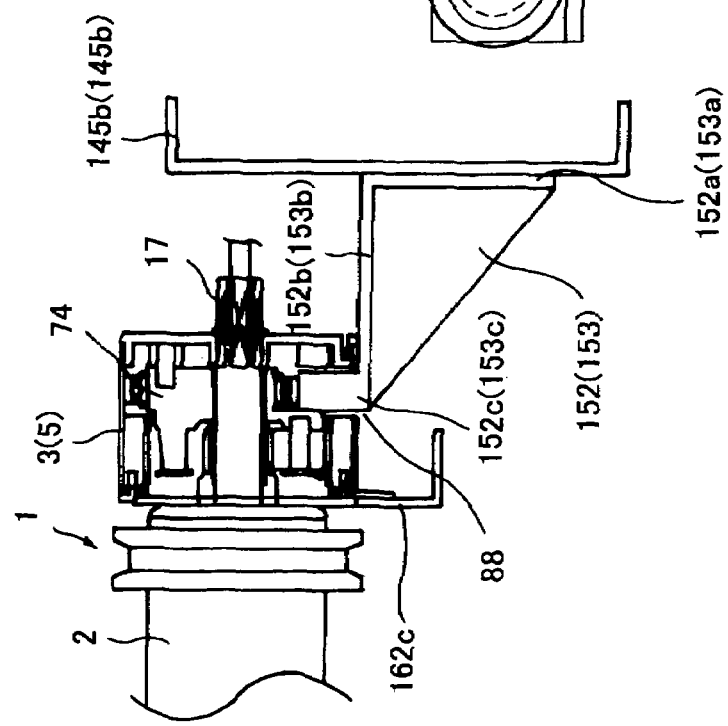

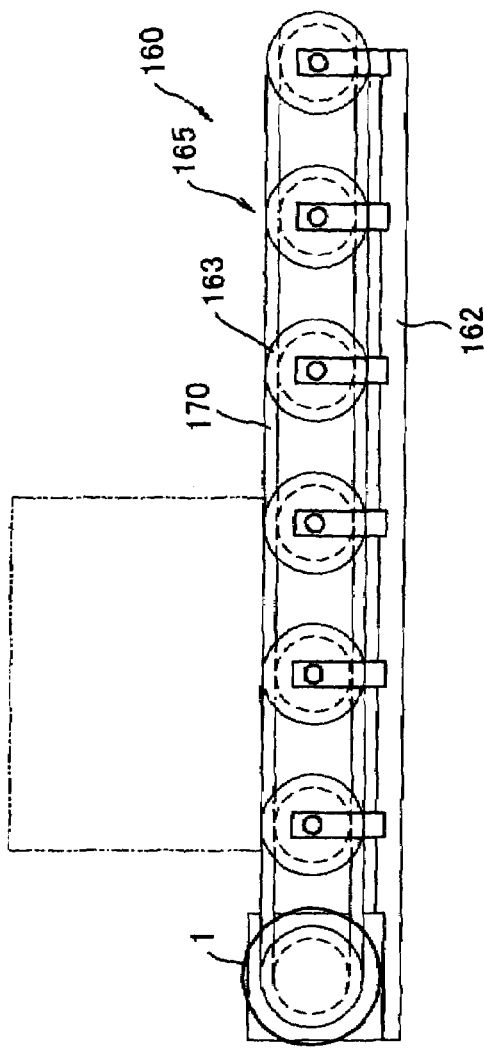
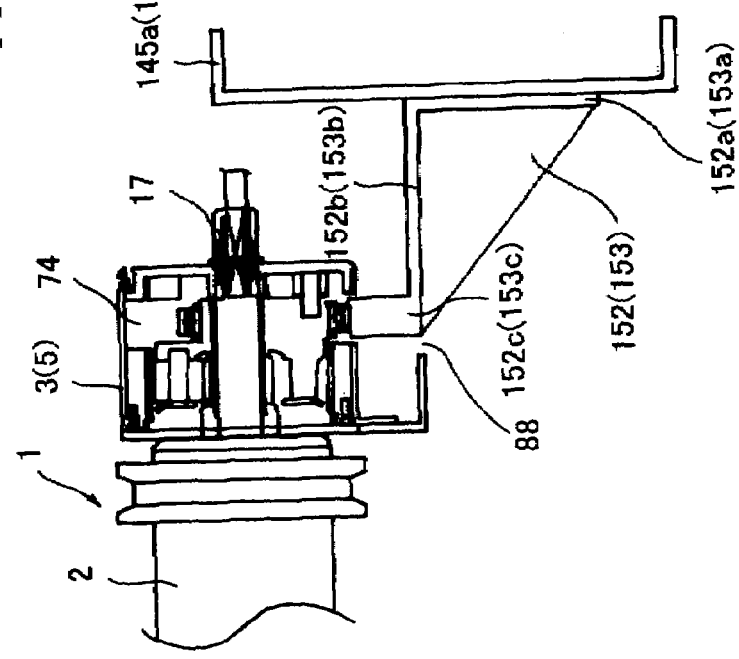
FIG. 16A
FIG. 16B

DRIVING DEVICE AND DIVERTER, DIVERTING UNIT, AND CONVEYING APPARATUS INCORPORATING THE DRIVING DEVICE

CROSS-REFERENCE TO RELATED APPLICATIONS

The present application is based on, and claims priority under 35 U.S.C. section 119 from, Japanese Patent Application Nos. 2004-224412 and 2004-224413 both filed on Jul. 30, 2004, the entire contents of which are hereby incorporated by reference herein.

BACKGROUND OF THE INVENTION

The present invention relates to an improvement of a driving device having a roller accommodating a motor therein.

DESCRIPTION OF THE RELATED ART

Conventionally, devices such as diverters disclosed in patent documents described below are proposed to meet one's request to branch articles from a first conveyor line for conveying articles in a specified direction to a second conveyor line arranged at the side of the first conveyor line in a conveying apparatus such as a roller conveyor.

Patent Document 1: JP 2003-285925A (Fujita)
Patent Document 2: JP 2003-261219A (Ikemizu)
Patent Document 3: JP 2003-81421A (Ikemizu)
Patent Document 4: U.S. 2003-0168320-A1 (Itoh, etc)

A transfer means employed in a carrying installation disclosed in the patent document 1 includes a belt conveyor arranged between rollers provided to convey articles in a predetermined conveying direction and is adapted to lift up and down the belt conveyor as needed by means of a lifting device such as a hydraulic cylinder. Therefore, the transfer means disclosed in the patent document 1 requires two power sources, one for driving the belt conveyor and the other for operating the lifting device, causing such a problem of system structure getting bulky.

A delivering device and a conveying direction converting device disclosed respectively in the patent documents 2 and 3 are adapted to convert a conveying direction of articles with one motor, being arranged to simultaneously rotate chains for conveying articles and disc cams for lifting up and down parallel rails that support the chains. It is therefore necessary for the delivering device and the conveying direction converting device to have completed diversion of articles by means of the chains until the cams go into a 360-degree turn, causing such a problem of an operating time of the chains and a distance capable of diverting articles by means of the chains getting limited.

These related arts perform an conveying operation for diverting articles and a lifting operation for lifting up and down a conveying plane formed by chains and belts with one power source, but had a problem of a sequence of diverting operation being imposed a restriction of some kind.

On the other hand, a conveying apparatus system disclosed in the patent document 4 (having one applicant common with the present invention) performs a conveying operation for diverting articles and a lifting operation for translationally lifting up and down a substantially horizontal conveying plane formed by belts and rollers with one power source, and further, includes a driving device capable of operating the conveying plane over a desired period of time and distance, but further improvement for smoothly diverting articles has been expected.

SUMMARY OF THE INVENTION

An object of the present invention made in view of the problems and drawbacks described above is therefore to provide an advanced driving device suitable for use in a diverter for diverting articles from a conveyor line.

Another object of the present invention is to provide an advanced diverter having a compact system structure whereby articles may be smoothly and adequately diverted from a conveyor line and a conveying apparatus incorporating the diverter.

In order to achieve this object, an aspect of the present invention provided herein is a driving device including a shaft having a central axis, a main body supported by the shaft, and at least one side body provided at the side of the main body and supported by the shaft, wherein the main body includes a roller supported rotatably relative to the shaft and around the central axis of the shaft, and a motor, a first planetary gear mechanism and a power transmitting member all accommodated in the roller, and wherein the side body includes a casing supported unrotatably relative to the shaft, and a second planetary gear mechanism and a rotational member both accommodated in the casing, each of the power transmitting member and the rotational member being supported rotatably relative to the shaft, the first planetary gear mechanism including a first sun gear, a first planet gear disposed at the outer side of the first sun gear, and a first internal gear disposed at the outer side of the first planet gear, wherein the first planet gear is arranged to engage with the first sun gear and the first internal gear, wherein the first internal gear is arranged in the roller unrotatably relative to the roller, and wherein the first sun gear is adapted to rotate relative to the shaft and around the central axis of the shaft upon reception of torque generated by the motor, the power transmitting member having a first projection extending out in a direction along the shaft for supporting the first planet gear rotatably relative to the first projection, the rotational member having a second projection extending out in a direction along the shaft, the second planetary gear mechanism including a second sun gear, a second planet gear disposed at the outer side of the second sun gear, and a second internal gear disposed at the outer side of the second planet gear, wherein the second sun gear is connected to the power transmitting member and arranged to rotate integrally therewith, wherein the second internal gear is arranged in the casing unrotatably relative to the casing, and wherein the second planet gear is supported rotatably relative to the rotational member and around the central axis of the second projection.

In such an arrangement, when rotation of the rotating member accommodated in the side body requires a lighter load than required by rotation of the main roller, the first planetary gear mechanism forms a planetary type, thereby transmitting power of the motor to the rotational member to rotate it. On the other hand, when rotation of the rotational member requires a heavier load than required by rotation of the roller, the arm of the first planet gear becomes stationary and the first planetary gear mechanism forms a star type. In this case, power of the motor is transmitted to the first internal gear through the first planet gear, thereby rotating the main roller. Consequently, the driving device embodying the present aspect smoothly switches a transmitting system of power generated by the motor according to a load on the rotational member, so as to transmit the power to either of the rotational member and the main roller.

The driving device embodying the present aspect has a power transmitting system switched according to a load on the rotational member, thereby enabling the main roller to rotate over a desired period of time.

As described above, the driving device embodying the present aspect rotates the rotational member and the roller with one motor accommodated in the roller. Consequently, such a driving device performs different operations such as conveyance of articles through power of the main roller as well as lifting up and down a conveying plane formed by, for example, the driving device through power of the rotational member.

The driving device embodying the present aspect operates the main roller in the main body and the rotational member in the side body only with the motor accommodated in the roller. Due to such an arrangement, there is no necessity to provide separate power sources, one for rotating the roller and the other for rotating the rotational member. Consequently, the present invention makes system structure of apparatus or equipment employing the present driving device more compact and saves on manufacturing costs of these apparatus or equipment.

In the present application, the motor is preferably an electrical motor, but is not limited thereto. The shaft (viz., main shaft) may be an integral member penetrating through the whole driving device, but may be also a plurality of shafts serving as a whole as a main shaft supporting the main body and the side body.

In the driving device of the invention, it is preferable that the rotational member and the casing each have an abutting portion, and that the rotational member is inhibited from rotating relative to the shaft after rotating toward a predetermined angular position relative to the shaft by abutment of the abutting portion of the rotational member to that of the casing.

In such an arrangement, load on the rotational member is switched by an abutment of the abutting portions each other, thereby smoothly switching the transmitting system of the power generated by the motor.

Another aspect of the present invention provided herein is a driving device including a shaft having a central axis, a main body supported by the shaft, and at least one side body provided at the side of the main body and supported by the shaft, wherein the main body includes a roller supported rotatably relative to the shaft and around the central axis of the shaft, and a motor, a first planetary gear mechanism and a power transmitting member all accommodated in the roller, and wherein the side body includes a casing supported unrotatably relative to the shaft, and a second planetary gear mechanism and a rotational member both accommodated in the casing, the power transmitting member being supported rotatably relative to the shaft, the second planetary gear mechanism being adapted to make up a planetary-type planetary gear mechanism, the rotational member being adapted to have a state selected from states in which the rotational member is rotatable and unrotatable relative to the shaft, when the rotational member is rotatable relative to the shaft, the first planetary gear mechanism being adapted to make up a planetary-type planetary gear mechanism whereby torque of the motor is transmitted to the rotational member to rotate the member relative to the shaft, and when the rotational member is unrotatable relative to the shaft, the first planetary gear mechanism being adapted to make up a star-type planetary gear mechanism whereby torque of the motor is transmitted to the first internal gear to rotate the roller around the central axis of the shaft.

In the driving device embodying the present aspect, on the condition that the rotational member in the side body is rotatable, the first planetary gear mechanism forms a planetary type whereby torque of the motor comes transmittable to the rotational member. On the other hand, on the condition that the rotational member is unrotatable, the first planetary gear mechanism forms a star type. Consequently, the driving device embodying the present aspect switches the power transmitting system for transmitting the power of the motor based on whether or not the rotational member is rotatable so as to rotate either the rotational member in the side body or the main roller in the main body. Consequently, the present aspect provides the driving device capable of smoothly switching the transmitting system of the power generated by the motor and transmitting the power to either the rotational member or the main roller. The present aspect further provides the driving device capable of rotating the main roller over a desired period of time.

As described above, the driving device embodying the present aspect performs both rotation of the rotational member and rotation of the main roller with one motor accommodated in the main roller. Due to the feature, if and when the rotational member is linked with a lifting device, for example, the driving device embodying the present aspect performs not only an operation such as conveyance of articles through power of the main roller but also a different operation such as lifting up and down the driving device through power of the rotational member.

Since the driving device embodying the present aspect operates the main roller in the main body and the rotational member in the side body separately enough to dispense with separate power sources, one for rotating the roller and the other for rotating the rotational member, apparatus or equipment employing the driving device achieves compactification of system structure thereof and keeps a lid on manufacturing costs.

It is preferable that the driving device is adapted to inhibit the rotational member from rotating further more upon rotation of the member towards a predetermined angular position relative to the shaft, but to allow the member to rotate in a reverse direction.

In such an arrangement, upon inhibition of rotation of the rotational member, the first planetary gear mechanism is switched from a planetary type to a star type, so as to smoothly switch the transmitting system of the power generated by the motor. Reverse rotation of the motor switches the first planetary gear mechanism from a star type to a planetary type, so as to switch the power transmitting system smoothly again.

In the driving device, it is preferable that the first sun gear, the first planet gear, the first internal gear, the second sun gear, the second planet gear, the second internal gear, the power transmitting member, and the rotational member each have a rotational axis extending out in a direction substantially along the shaft.

Due to such an arrangement, the structure is simplified.

In the driving device of the present invention, the rotational member is preferably supported eccentrically rotatably.

Such an arrangement, by making the rotational member to be supported by a seat or the like and to rotate, allows the driving device to be lifted up and down relative to the seat or the like.

It is preferable for the driving device of the present invention that a pair of the side bodies are arranged adjacent to the opposite ends of the main roller.

Such an arrangement supports the conveying device lifted up and down by means of the lifting device in more stable condition.

It is further preferable for the driving device of the present invention that the rotational member is accommodated in the casing of the side body, the casing having an opening at an axial position corresponding to the rotational member.

Such an arrangement draws power generated by rotation of the rotational member out of the opening while accommodating the rotational member in the side body.

Still another aspect of the present invention is to provide a diverter including a conveying device for conveying articles, a supporting member for supporting the conveying device, a lifting device for lifting up and down the supporting member, and a driving device for transmitting power to the conveying device and the lifting device, wherein the driving device is constituted by a unit including a motor and a power transmitting mechanism, the power transmitting mechanism being adapted to be switched in response to a load acting on the conveying device and/or the lifting device so as to transmit power of the motor to either of the conveying device and the lifting device, and wherein the supporting member is lifted up by means of the lifting device so as to incline the conveying device in a diverting direction.

In the diverter embodying the present aspect, since both the conveying device and the lifting device are driven by the driving device that is a unit including the motor and the power transmitting mechanism, there is no need to provide separate power sources, one for the conveying device and the other for the lifting device. This diverter further avoids the need to provide the large number of the motors and the transmitting mechanisms, because the power transmitting mechanism is switched in response to a load acting on the conveying device and/or the lifting device. This diverter renders its system structure simple.

This diverter is provided with the power transmitting mechanism that is switched in response to a load acting on the conveying device and/or the lifting device, thereby individually performing a diverting operation of articles by means of the conveying device and a lifting operation by means of the lifting device. This diverter has therefore not only no restriction on the operation by the conveying device resulting from the operation by the lifting device but also no restriction on the operation by the lifting device resulting from the operation by the conveying device. Consequently, this diverter diverts articles with certainty.

The diverter embodying the present aspect diverts articles with the conveying device inclined, thereby also smoothly diverting articles.

Yet another aspect of the present invention is to provide a diverter including a conveying device for conveying articles, a supporting member for supporting the conveying device, a lifting device for lifting up and down the supporting member; and a driving device for supplying power to one selected from the group of the conveying device and the lifting device, the driving device including a shaft having a central axis, a main body supported by the shaft, and at least one side body provided at the side of the main body and supported by the shaft, wherein the main body includes a roller supported rotatably relative to the shaft and around the central axis of the shaft, and a motor, a first planetary gear mechanism and a power transmitting member all accommodated in the roller, and is adapted to supply power to the conveying device by means of the roller, and wherein the side body includes a casing supported unrotatably relative to the shaft, and a second planetary gear mechanism and a rotational member both accommodated in the casing, and is adapted to supply power to the lifting device by means of the rotational member, each of the power transmitting member and the rotational member being supported rotatably relative to the shaft, the first planetary gear mechanism including a first sun gear, a first planet gear disposed at the outer side of the first sun gear, and a first internal gear disposed at the outer side of the first planet gear, wherein the first planet gear is arranged to engage with the first sun gear and the first internal gear, wherein the first internal gear is arranged in the roller unrotatably relative to the roller, and wherein the first sun gear is adapted to rotate relative to the shaft and around the central axis of the shaft upon reception of torque generated by the motor, the power transmitting member having a first projection extending out in a direction along the shaft for supporting the first planet gear rotatably relative to the first projection, the rotational member having a second projection extending out in a direction along the shaft, the second planetary gear mechanism including a second sun gear, a second planet gear disposed at the outer side of the second sun gear, and a second internal gear disposed at the outer side of the second planet gear, wherein the second sun gear is connected to the power transmitting member and arranged to rotate integrally therewith, wherein the second internal gear is arranged in the casing unrotatably relative to the casing, and wherein the second planet gear is supported rotatably relative to the rotational member and around the central axis of the second projection.

In the driving device involved in the diverter embodying the present aspect, when rotation of the rotating member accommodated in the side body requires a lighter load than required by rotation of the main roller, the first planetary gear mechanism forms a planetary type, thereby transmitting power of the motor to the rotational member to rotate it. On the other hand, when rotation of the rotational member requires a heavier load than required by rotation of the roller, the arm of the first planet gear becomes stationary and the first planetary gear mechanism forms a star type. In this case, power of the motor is transmitted to the first internal gear through the first planet gear, thereby rotating the main roller. Consequently, the diverter embodying the present aspect smoothly switches a transmitting system of power generated by the motor, so as to operate either the lifting device or the conveying device.

The driving device employed in the diverter embodying the present aspect accurately switches the power transmitting system thereby rotating the main roller and operating the conveying device over a desired period of time. Consequently, the diverter embodying the present aspect diverts articles with certainty.

As described above, the driving device employed in the present aspect rotates the rotational member and the roller only with one motor accommodated in the roller. Consequently, in the diverter embodying the present aspect, only the motor in the main body covers both the power supplied to the conveying device and to the lifting device.

Since the diverter embodying the present aspect operates the conveying device and the lifting device with one driving source, the present invention makes the diverter to be compact and keeps a lid on manufacturing costs.

Yet another aspect of the present invention is to provide a diverter including a conveying device for conveying articles, a supporting member for supporting the conveying device, a lifting device for lifting up and down the supporting member, and a driving device for supplying power to one selected from the group of the conveying device and the lifting device, the driving device comprising a shaft having a central axis, a main body supported by the shaft, and at least one side body provided at the side of the main body and supported by the shaft, wherein the main body includes a roller supported rotatably relative to the shaft and around the central axis of the shaft, and a motor, a first planetary gear mechanism and a power transmitting member all accommodated in the roller, and is adapted to supply power to the conveying device by means of the roller, and wherein the side body includes a casing supported unrotatably relative to the shaft, and a second planetary gear mechanism and a rotational member both accommodated in the casing, and is adapted to supply power to the lifting device by means of rotational member, the power transmitting member being supported rotatably relative to the shaft, the second planetary gear mechanism being adapted to make up a planetary-type planetary gear mechanism, the rotational member being adapted to have a state selected from states in which the rotational member is rotatable and unrotatable relative to the shaft, when the rotational member is rotatable relative to the shaft, the first planetary gear mechanism being adapted to make up a planetary-type planetary gear mechanism whereby torque of the motor is transmitted to the rotational member to rotate the member relative to the shaft, and when the rotational member is unrotatable relative to the shaft, the first planetary gear mechanism being adapted to make up a star-type planetary gear mechanism whereby torque of the motor is transmitted to the first internal gear to rotate the roller around the central axis of the shaft.

In the driving device employed in the diverter embodying the present aspect, on the condition that the rotational member in the side body is rotatable, the first planetary gear mechanism forms a planetary type whereby torque of the motor comes transmittable to the rotational member. On the other hand, on the condition that the rotational member is unrotatable, the first planetary gear mechanism forms a star type. In this arrangement, the diverter embodying the present aspect switches the power transmitting system in the driving device as needed so as to operate either the conveying device or the lifting device. Consequently, the present aspect provides the diverter capable of smoothly switching an operation by the conveying device or by the lifting device so as to accurately divert articles. The present aspect further provides the diverter capable of operating the conveying device over a desired period of time.

The present aspect dispenses with separate power sources, one for operating the conveying device and the other for operating the lifting device, thereby providing the diverter with simple and compact system structure.

It is preferable for the diverter of the present invention that the lifting device includes the rotational member supported eccentrically rotatably, and that the outer edge of the rotational member is directly or indirectly supported by a support so that the lifting device lifts up and down the supporting member in response to rotation of the rotational member.

In such an arrangement, eccentric rotation of the rotational member by driving the motor of the driving device changes a distance between the supporting member and the support to lift up and down the conveying device in the diverter.

It is preferable for the diverter of the present invention that the supporting member is lifted relative to the support so as to incline the conveying device in a diverting direction.

Such an arrangement diverts articles with the conveying device inclined (with decline formed from an upstream of the moving direction of articles to a downstream), thereby saving energy required for diverting articles.

It is preferable that the diverter of the present invention has the rotational member accommodated in the casing of the side body, the casing having an opening at an axial position corresponding to the rotational member.

According to such an arrangement, the power transmitted to the rotational member is further transmitted via other member inserted in or leaded out of the opening so as to lift up and down the diverter.

It is preferable that the diverter of the present invention has a pair of the side bodies that are arranged adjacent to the opposite ends of the main roller.

Such an arrangement supports the conveying device lifted up and down by means of the lifting device in more stable condition.

In the diverter of the present invention, the conveying device may be a conveyor including a belt carried by the main roller.

Such an arrangement performs a smooth diversion with simple structure.

Yet another aspect of the present invention is to provide a diverting unit including a frame having a frame shaft and a support and any above-described diverter mounted to the frame, the driving device being supported by the support, wherein the supporting member has a downstream end in a conveying direction of the conveying device supported rotatably relative to the frame by means of the frame shaft, and an upstream end supported by the driving device, and wherein the driving device is adapted to be lifted up and down relative to the support.

According to such an arrangement, the conveying device of the diverter is inclined to scoop up articles from the conveyor line by lifting up the supporting member by means of the lifting device operated with an operation of the driving device.

Yet still another aspect of the present invention is to provide a diverting unit including a frame having a frame shaft and a support and a pair of any above-described diverters mounted to the frame and adapted to divert articles in opposite directions, each of the diverters having the driving device supported by the support and adapted to be lifted up and down relative to the support, and the supporting member that has a downstream end in a conveying direction of the conveying device supported rotatably relative to the frame by means of the frame shaft and an upstream end supported by the driving device.

According to such an arrangement, a pair of the diverting units having opposite diverting directions are integrated, so the structure is compactified.

Yet still another aspect of the present invention is to provide a conveying apparatus including a conveyor line for conveying articles in a predetermined direction, a branch line for diverting articles in an intersecting direction with the conveying direction of the articles on the conveyor line, and a branch area formed at the intersection of the conveyor line with the branch line, wherein the branch area is adapted to install any above-described diverter in such a manner that a conveying direction of the conveying device conforms to a diverting direction at the branch line.

Since the conveying apparatus embodying the present aspect incorporates the diverter described above, installation of the diverter requires little space. Further, the conveying apparatus embodying the present aspect smoothly switches an operation of the lifting device and an operation of the conveying device, so as to accurately divert articles on the branch area to the branch line.

It is preferable for the conveying apparatus of the present invention that the driving device is lifted up relative to the support so that the conveying device of the diverter is inclined toward the branch line away from the conveyor line.

Such a conveying apparatus diverts articles with the conveying device inclined (with decline formed from an upstream of the moving direction of articles to a downstream), thereby saving energy required for diverting articles.

It is preferable for the conveying apparatus of the present invention that the diverter has the driving device and the lifting device arranged at an upstream side in the conveying direction of the conveying device, and a downstream side of the diverter being supported rotatably by means of a frame shaft, the conveying device being arranged to cross the branch area.

The diverter in such a conveying apparatus lifted up by operation of the driving device scoops up an article on the branch area and divert it downstream of the conveying device.

It is preferable for the conveying apparatus of the present invention that the branch line further includes a frame having a frame shaft and extending out in an intersecting direction with the conveyor line, the frame further having a support, whereby the driving device is supported, wherein the supporting member has a downstream end in a conveying direction of the conveying device supported rotatably relative to the frame by means of the frame shaft, and an upstream end supported by the driving device, and wherein the driving device is adapted to be lifted up and down relative to the support.

In the conveying apparatus embodying the present aspect, the supporting member of the diverter has a proximal end supported by means of the frame shaft, and a distal end supported by means of the driving device with the consequence that the conveying device is inclined by lifting up the supporting member by an operation of the lifting device with an operation of the driving device to scoop up articles from the conveyor line.

As described above, such a conveying apparatus diverts articles by lifting up and down one end of the diverter, thereby saving energy required for a lifting operation.

It is preferable for the conveying apparatus of the present invention that the lifting device includes the rotational member supported eccentrically rotatably, and the outer edge of the rotational member is directly or indirectly supported by a support so that the lifting device lifts up and down the supporting member in response to rotation of the rotational member.

According to such an arrangement, eccentric rotation of the rotational member by driving the motor of the driving device changes a distance between the supporting member and the support to lift up and down the conveying device in the diverter.

It is preferable for the conveying apparatus of the present invention that the conveyor line has a plurality of rollers arranged at specified intervals, wherein the supporting member of the diverter is arranged to be lifted up and down between the rollers arranged at the branch area.

According to such an arrangement, the structure of the conveying apparatus is simplified and compactified.

The present invention provide a driving device adapted to operate a main roller in a main body and a rotational member in a side body with one motor accommodated in the main body, a diverter having a compact system structure and capable of smoothly and accurately diverting articles from a conveyor line, a diverting unit that is an integration of the diverters facing to right and left with a frame, and a conveying apparatus incorporating the diverter or the diverting unit.

BRIEF DESCRIPTION OF THE DRAWINGS

FIGS. 15A and 15B illustrate the diverter shown in FIG. 6, FIG. 15A being an enlarged view of an essential portion of the diverter showing a structure adjacent to a casing of the driving device in a first state of the diverter, FIG. 15B being a schematic diagram of the state of the diverter at this time in FIG. 15A; and FIGS. 16A and 16B illustrate the diverter shown in FIG. 6, FIG. 16A being an enlarged view of the essential portion of the diverter showing a structure adjacent to the casing of the driving device in a second state of the diverter, FIG. 16B being a schematic diagram of the state of the diverter at this time in FIG. 16A.

DESCRIPTION OF THE PREFERRED EMBODIMENTS

Figure 1:
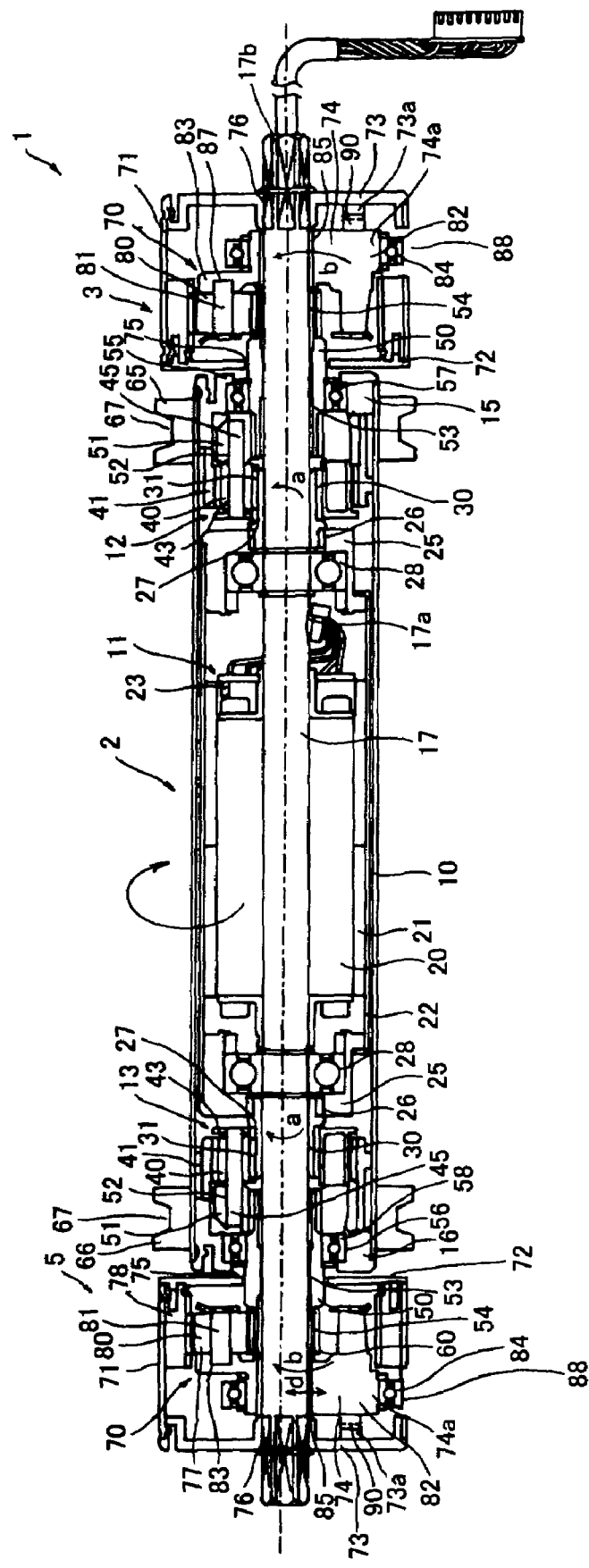
FIG. 1 is a sectional view of a driving device that is a preferred embodiment of the present invention in a first operating state.
Figure 2:
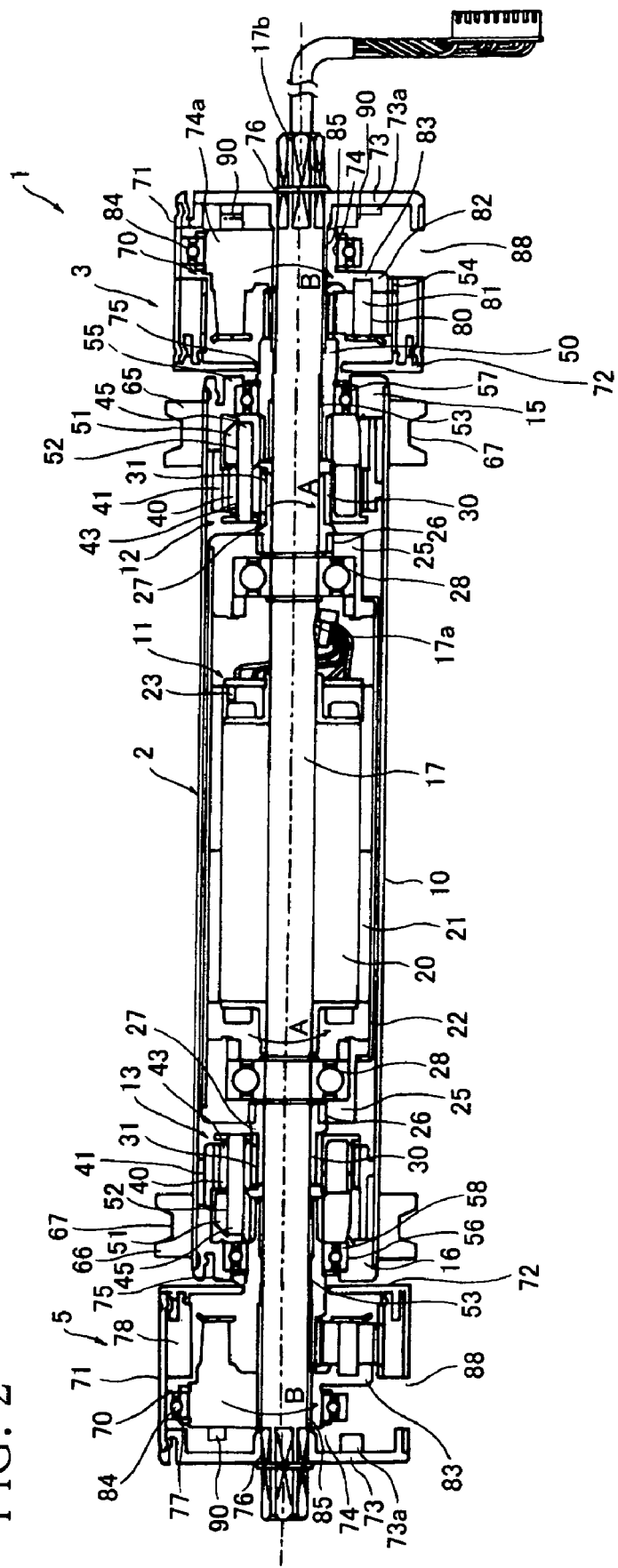
FIG. 2 is a sectional view of the driving device in a second operating state.
Figure 3:
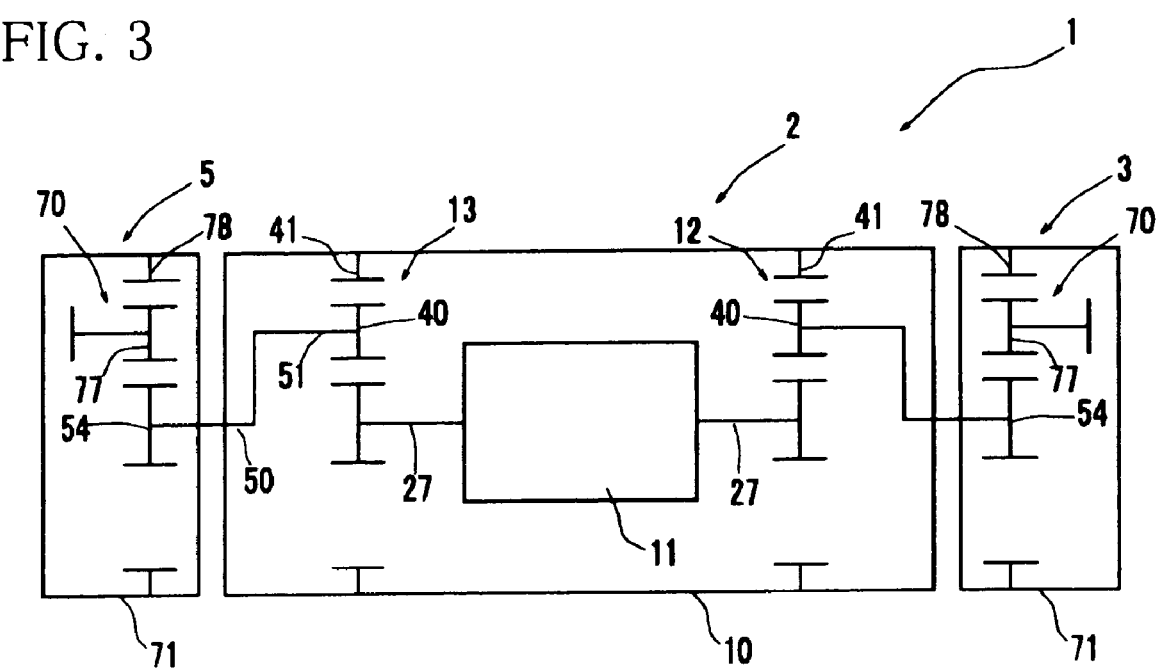
FIG. 3 is a schematic representation of the driving device shown in FIGS. 1 and 2.

Now, a driving device that is a preferred embodiment of the present invention will be described below, making reference to the accompanying drawings. A structure of the driving device is shown in FIGS. 1 and 2, and its mechanism is diagrammatically shown in FIGS. 3 to 5. Referring to FIG. 1, the reference numeral 1 denotes a motorized roller (viz., a driving device) in the embodiment. The driving device 1 consists mainly of a main roller 2 (viz., a main body) and cylindrical casings (also called "side rollers") 3 and 5 (viz., side bodies) disposed at its both sides. The roller 2 includes a hollow cylinder 10 (viz., a roller) accommodating a motor 11 and first planetary gear mechanisms 12 and 13 therein. The cylinder 10 is a metallic cylindrical member with openings at its both sides, which are closed by closing members 15 and 16 made by a plastic or a metal. The roller 2 has a central axis of the cylinder 10 with a main shaft 17 inserted therein coaxially. The roller 2 is constructed such that the shaft 17 penetrates the closing members 15 and 16 so that the cylinder 10 is rotatably supported relative to and around the shaft 17. The main shaft 17 is a shaft introduced through the cylinder 10 having a cross section with chamfered corners to be hexagonal at its opposite ends and is constructed so that such as an electric wiring connected to the motor 11 is insertable therein. The shaft 17 is supported unrotatably relative to a frame (not shown).

The motor 11 is a brushless motor of a so-called "outer rotor type" with a stator 20 secured to the substantially central part in a longitudinal direction of the shaft 17 and a rotor 21 enclosing an outer periphery of the stator 20. The stator 20 is a coil formed of a conducting wire wound around an iron core. The electrical wiring connected to the rotor 21 is introduced into the shaft 17 through an opening 17a formed on the shaft 17, and derived from the other opening 17b at one end (at the right side in FIG. 1) of the shaft 17. The rotor 21 is secured to the inner wall of a cylindrical shell 22 and arranged with predetermined space between itself and the stator 20.

The motor 11 is provided with a position detector 23 for detecting a pole position of the rotor 21. In the embodiment, the position detector 23 employs a Hall IC that is an integration of a Hall element and a whole or a part of a power switching circuit. The wiring connected to the position detector 23 is introduced into the shaft 17 through the opening 17a and derived from the opening 17b at one end (at the right side in FIG. 1) of the shaft 17.

The shell 22 has opposite ends closed with closing members 25 and 25. Each closing member 25 has a through-hole 26 at its center. Hollow cylindrical rotational shafts 27 and 27 are inserted from outside the shell 22 and through the through-holes 26 and 26. The shaft 17 is inserted through the rotational shafts 27 and 27. The closing members 25 and 25 have bearings 28 and 28, whereby the shaft 17 is supported to be relatively rotatable.

The rotational shafts 27 and 27 rotate integrally with the closing members 25 and 25 and the rotor 21 of the motor 11. The rotational shafts 27 and 27 have cylindrical main bodies 30 and 30 extending out of the shell 22. The rotational shafts 27 and 27 function as output shafts for outputting power of the motor 11, and also as external gears because each of the rotational shafts 27 and 27 is formed as a combination of the main body 30 and a toothed portion 31 at its outer periphery. The rotational shafts 27 and 27 are coaxial with the shaft 17 and function as sun gears of the first planetary gear mechanisms 12 and 13.

The first planetary gear mechanism 12 and 13 are arranged at the opposite ends of the cylinder 10. Each of the planetary gear mechanism 12 and 13 consists essentially of a planet gear 40 (viz., a first planet gear) and an internal gear 41 (viz., a first internal gear) at an outer periphery of the main body 30 of the rotational shaft 27 functioning as the sun gear. The internal gear 41 is arranged adjacent to the closing members 15 and 16 and secured to the inner wall of the cylinder 10. The planet gear 40 is arranged to engage with both the internal gear 41 and the toothed portion 31 of the rotational shaft 27. The planet gear 40 is revolvable around the rotational shaft 27 along the inner circumference of the internal gear 41. The planet gear 40 is further rotatable around a pin 45 inserted in a through-hole 42 formed at its central axis.

The planet gear 40 is connected to a power transmitting member 50 by means of the pin 45. More specifically, the power transmitting member 50 is integrated at its proximal end with a main body connector 51 that functions as a carrier (an arm), so as to be connected to the planet gear 40 by means of the pin 45 inserted in an insertion hole 52 formed at the connector 51. That enables the planet gear 40 and the power transmitting member 50 to integrally revolve and rotate in an orbital manner around the central axis of the shaft 17, and further, the planet gear 40 to independently rotate in a spinning manner around the pin 45 relative to the power transmitting member 50. More specifically, the planet gear 40 is rotatably supported relative to the power transmitting member 50 and around the axis of the pin 45 that is a projection extending in a direction along the shaft 17 from the power transmitting member 50.

The power transmitting member 50 has a shaft insertion hole 53 for accommodating the shaft 17 at its central axis and is rotatable relative to the shaft 17. The shaft 17 is inserted in the shaft insertion hole 53 in the power transmitting member 50. A distal end of the member 50 opposite to the main body connector 51 (viz., position near a side body connector 54) extends out from the end of the cylinder 10. The power transmitting members 50 each are inserted to rotate relative to the cylinder 10 by means of bearings 57 and 58 fitted in through-holes 55 and 56 formed at the central axis of the closing members 15 and 16 respectively.

Each of the power transmitting member 50 has an external gear-like shape with a toothed portion 60 formed at an outer periphery of a portion protruding toward an outside of the cylinder 10 (viz., the side body connector 54). Each of the power transmitting members 50 is coaxial with the shaft 17, and functions as a sun gear of a second planetary gear mechanism 70 accommodated in the casing 3 or 5.

A pair of ring-shaped belt carrying members 65 and 66 is fixed to the outer periphery of the cylinder 10 at its both end portions respectively. As shown in FIG. 1, the belt carrying members 65 and 66 are of groove shape in its cross sections, so that each center groove 67 carries a belt (not shown).

The casings 3 and 5 each essentially consists of, as shown in FIG. 1, the second planetary gear mechanism 70 and an eccentric member 74 both accommodated in a cavity formed by a cylindrical casing 71 with closing members 72 and 73 attached thereto, the cylindrical casing 71 having an opening diameter larger than that of the cylinder 10 of the main roller 2. The closing member 72 closes an opening of a proximal end (at a position near the main roller 2) of the cylindrical casing 71, having an insertion hole 75 that accommodates the power transmitting member 50 at its center. The closing member 73 closes an opening of a distal end of the cylindrical casing 71, having at its center a hexagonal insertion hole 76 so as to fit with the cross section of the end of the shaft 17. The shaft 17, as shown in FIG. 1, is inserted through the cylindrical casing 71, axially the opposite ends extending out of the cylindrical casings 71 through the insertion holes 76, with the consequence that the shaft 17 is supported unrotatably relative to the casings 3 and 5.

The closing member 73 has an abutting portion 73a that protrudes inward each of the casings 3 and 5 when the closing member 73 is attached to the cylindrical casing 71. The abutting portion 73a is a portion that an abutting portion 90 of the eccentric member 74 (described below) abuts to when rotation of the eccentric member 74 around the shaft 17 makes the outer periphery of the eccentric member 74 to approach nearest to an opening 88 (described below). The closing member 73, as shown in FIG. 1, is attached in such a manner that the abutting portion 73a comes below the shaft 17 when the opening 88 (described below) is arranged to face downwards.

The second planetary gear mechanism 70 is constituted by the power transmitting member 50 inserted through the insertion hole 75 of the closing member 72 adopted as the sun gear with a planet gear 77 (a second planet gear) and an internal gear 78 (a second internal gear) arranged around its outer periphery. The internal gear 78 is secured to an inner periphery of the cylindrical casing 71 at a position near the closing member 72. The planet gear 77 engages with the internal gear 78 and the toothed portion 60 formed at the outer periphery of the power transmitting member 50 having the insertion hole 53. The planet gear 77 is revolvable around the outer periphery of the power transmitting member 50 (viz., the sun gear) along the inner periphery of the internal gear 78. The planet gear 77 is also connected by a pin 81 (i.e., a projection extending in a direction along the shaft 17) inserted in a through-hole 80 formed at the central axis of the gear 77 to be rotatable relative to the eccentric member 74 and around the central axis of the pin 81.

The eccentric member 74, as shown in FIG. 1, includes a disk-like shaped eccentric portion 82 and a gear connecting portion 83 connected to the planet gear 77. The eccentric portion 82 has a shaft insertion hole 85 for accommodating the shaft 17, the central axis of the shaft insertion hole 85 being at the distance (d) from the central axis of the eccentric portion 82. The eccentric member 74 is supported to be rotatable relative to the shaft 17 inserted in the shaft insertion hole 85. The eccentric portion 82 has an outer periphery engaged with a bearing 84.

The gear connecting portion 83 of the eccentric member 74 faces toward the closing member 72, or toward the second planetary gear mechanism 70, extending out in an eccentric direction of the shaft insertion hole 85 relative to the eccentric portion 82, so as to function as the carrier (viz., the arm) for the planet gear 77. The gear connecting portion 83 has a pin insertion bore 87 in which the pin 81 is insertable. The planet gear 77 is rotatably mounted by the pin 81 inserted in the bore 87. An abutting portion 90 protrudes in a direction opposite to the gear connecting portion 83 and at a part toward a top portion 74a that is farthest from the shaft insertion hole 85. The abutting portion 90 abuts to the abutting portion 73a of the closing member 73 when rotation of the eccentric member 74 around the shaft 17 makes the outer periphery of the eccentric member 74 and the bearing 84 mounted thereon to approach nearest to the opening 88. With the abutting portion 90 abutting to the abutting portion 73a of the closing member 73, the eccentric member 74 is inhibited from rotating around the axis of the shaft 17.

The cylindrical casing 71 has at its outer periphery the opening 88 extending in a circumferential direction of the cylindrical casing 71. The opening 88 is formed at a position in the axial direction corresponding to a position where the eccentric portion 82 of the eccentric member 74 accommodated in each of the casings 3 and 5 is mounted.

In operation, the driving device 1 of the present embodiment will work as follows. In the driving device 1, in the case that the eccentric member 74 is freely rotatable around the shaft 17, the second planetary gear mechanism 70 forms a planetary type, whereas in the case that the eccentric member 74 is unrotatable, the planet gear 77 and the power transmitting member 50 functioning as the sun gear as well as the internal gear 78 remain stationary, not rotating at all.

More specifically, as shown in FIG. 2, when the top portion 74a of the eccentric member 74, that is, the abutting portion 90 is kept away from the opening 88, the eccentric member 74 rotates around the shaft 17.

Figure 4:
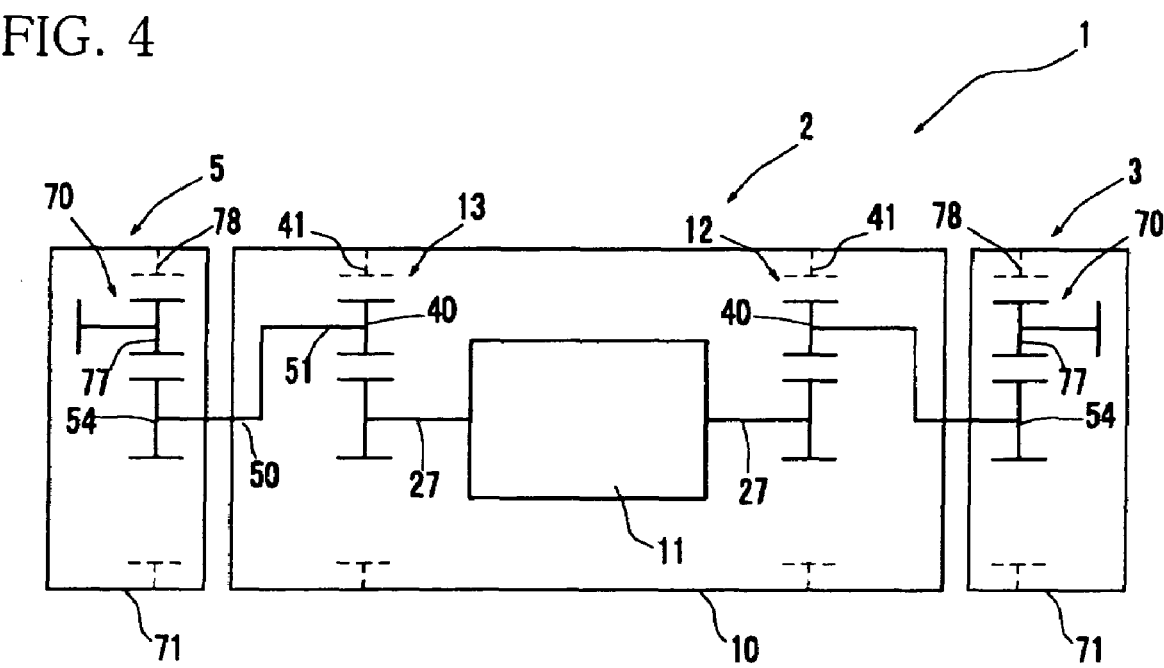
FIG. 4 is a schematic representation of the driving device shown in FIGS. 1 and 2 in the second operating state.

External force to the main roller 2 to inhibit the cylinder 10 from rotating in a state of the eccentric member 74 freely rotatable around the shaft 17, as shown by a dotted line in FIG. 4, locks up the internal gear 41 of each of the first planetary gear mechanisms 12 and 13. In this state, the planet gear 40 and the rotational shaft 27 that constitute the sun gear of each of the first planetary gear mechanisms 12 and 13 is freely rotatable. Consequently, in the state of the eccentric member 74 being freely rotatable, as shown by a solid line in FIG. 4, the first planetary gear mechanisms 12 and 13 constitute planetary-type planetary gear mechanisms.

As shown in FIG. 2, in a state of the abutting portion 90 at a position distant from the abutting portion 73a of the closing member 73, the energized motor 11 causes positive rotation of the rotational shaft 27, which is the output shaft for the motor 11, as indicated by an arrow (A) in FIG. 2, thereby transmitting the power to the planet gear 40 engaged with the toothed portion 31 of the rotational shaft 27. As described above, the internal gear 41 being locked up, the planet gear 40 revolves in an orbital manner around the outer periphery of the rotational shaft 27 with rotating in a spinning manner around the pin 45. Consequently, the power transmitting member 50 connected to the planet gear 40 by the pin 45 starts to rotate around the shaft 17.

As described above, both the casings 3 and 5 are unrotatable relative to the shaft 17. Therefore, in a state of the casings 3 and 5 unrotatable by having the shaft 17 attached to such as a frame not shown or inserting such as a blocking member in the opening 88, the second planetary gear mechanism 70 forms a planetary type. Thus, when the power transmitting member 50 starts to rotate, the planet gear 77 engaged with the toothed portion 60 of the side body connector 54 of the power transmitting member 50 starts to revolve in an orbital manner around the power transmitting member 50 with rotating in a spinning manner around the pin 81, so that the eccentric member 74 connected to the planet gear 77, as indicated by an arrow (B) in FIG. 2, starts eccentric rotation relative to the shaft 17 in a positive direction.

Upon starting of eccentric rotation of the eccentric member 74 from the state shown in FIG. 2, the outer periphery of the eccentric member 74 gradually approaches to the opening 88. Then with the top portion 74a of the eccentric member 74 having approached nearest to the opening 88, that is, with the top portion 74a being visible through the opening 88, as shown in FIG. 1, the abutting portion 90 of the eccentric member 74 abuts to the abutting portion 73a on the lower side of the closing member 73 (viz., at a position near the opening 88), thereby inhibiting the eccentric member 74 from rotating.

Figure 5:
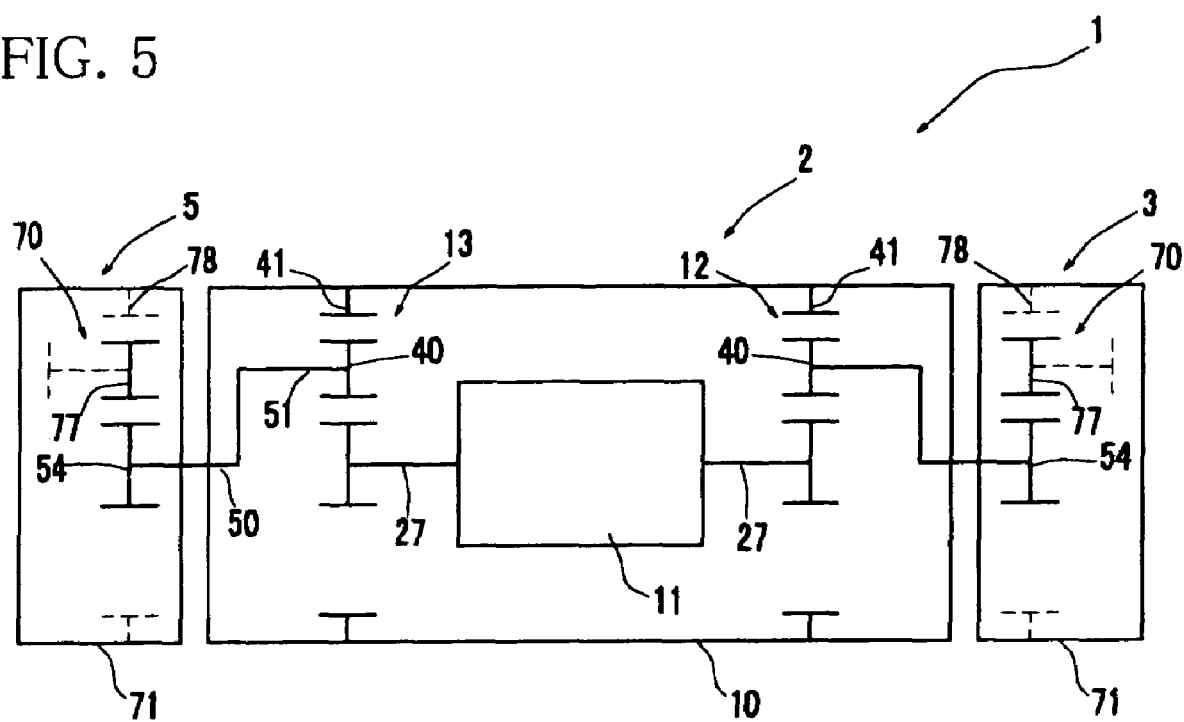
FIG. 5 is a schematic representation of the driving device shown in FIGS. 1 and 2 in the first operating state.

Upon stopping of rotation of the eccentric member 74, the planet gear 77 connected thereto by the pin 81 and the power transmitting member 50 engaged with the planet gear 77 are also inhibited from rotating, rendering the planet gear 40 of each of the first planetary gear mechanisms 12 and 13 connected by the pin 45 to the main body connector 51 of the power transmitting member 50 unavailable to revolve in an orbital manner around the central axis of the shaft 17. More specifically, when load to inhibit the planet gear 77 from revolving grows larger than that to inhibit the cylinder 10 (or the internal gear 41) from rotating, as shown in FIG. 5, the first planetary gear mechanisms 12 and 13 are switched from a planetary type to a star type.

Upon switching of the planetary gear mechanisms 12 and 13 each to a star type, torque of the motor 11 is transmitted to the internal gear 41 secured to the inner periphery of the cylinder 10 through the rotational shaft 27 and the planet gear 40, thereby starting rotation of the cylinder 10 of the main body 2.

On the other hand, as shown in FIG. 1, in the state of the eccentric member 74 incapable of positive rotation due to the top portion 74a of the eccentric member 74 being adjacent to the opening 88, a small load is enough to rotate the eccentric member 74 in the reverse direction. Consequently, in the state shown in FIG. 1, upon starting of rotation of the motor 11 in the reverse direction, load to inhibit the planet gear 77 from revolving gets smaller than that to inhibit the cylinder 10 (or the internal gear 41) from rotating. That is, as shown by an arrow (a) in FIG. 1, rotation of the rotational shaft 27 of the motor 11 in the reverse direction switches each of the first planetary gear mechanisms 12 and 13 from a star type to a planetary type. In this state, torque generated by rotation of the motor 11 in the reverse direction makes the planet gear 40 and the power transmitting member 50 to rotate around the central axis of the shaft 17. Consequently, the planet gear 77 connected to the toothed portion 60 the power transmitting member 50 revolves around the central axis of the shaft 17, while the eccentric member 74 starts eccentrically rotate in the reverse direction (in the direction shown by an arrow (b) in FIG. 1).

Upon rotation of the eccentric member 74 in the reverse direction, the top portion 74a gradually leaves from the opening 88. At this moment, a controller (not shown) for the driving device 1 perceives degree of rotation of the eccentric member based on pulse signals outputted from the position detector 23 of the motor 11. When 180 degree of rotation in the reverse direction of the eccentric member 74 from the state that the abutting portion 90 contacts with the abutting portion 73a is perceived by the controller, the eccentric member 74 and the bearing 84 enclosing therearound are farthest from the opening 88.

As described above, the driving device 1 of the present embodiment has the single motor 11 functioning as a power source for rotation of the eccentric member 74 as well as a power source for rotation of the main roller 2, thereby ensuring that the device 1 has a compact system structure and is inexpensive to be manufactured.

The driving device 1 transmits power of the motor 11 to either the eccentric members 74 in the casings 3 and 5 or the internal gears 41 of the main roller 2 in response to loads acting on the eccentric members 74. In short, the device 1 smoothly switches a power transmitting system for transmitting power of the motor 11 in response to loads acting on the eccentric members 74. With the eccentric member 74 having reached a predetermined position, the device 1 switches the power transmitting system to use power of the motor 11 only for rotation of the main roller 2. Therefore, the driving device 1 allows the main roller 2 to operate for desired duration.

In the present embodiment, the eccentric member 74 is accommodated in the cylindrical casing 71 of each of the casings 3 and 5, but the present invention is not limited thereto and may employ the eccentric member 74 exposed outside.

In the present embodiment, the cylindrical casing 71 of each of the casings 3 and 5 is of a cylindrical shape, but the present invention is not limited thereto and may employ a cuboid housing, for example.

The present embodiment illustrates the eccentric member 74 offset from the main shaft 17, but the present invention is not limited thereto and may employ a member without offset from the shaft 17.

The motor 11 employed in the present embodiment is a so-called "outer rotor type" with the rotor 21 rotating around the stator 20 secured to the shaft 17, but the present invention is not limited thereto and may employ a motor with a rotor arranged at a central part of a stator rotating.

Now, a preferred embodiment of a diverter and a conveying apparatus employing the driving device 1 as a constituent will be described in detail below, making reference to the accompanying drawings. In the description below, if not otherwise specified, a vertical position relationship is based on a normal installation shown in the drawings, whereas a horizontal position relationship is based on a direction of articles moving down a main conveyor line 101 of a conveying apparatus 100.

Figure 6:
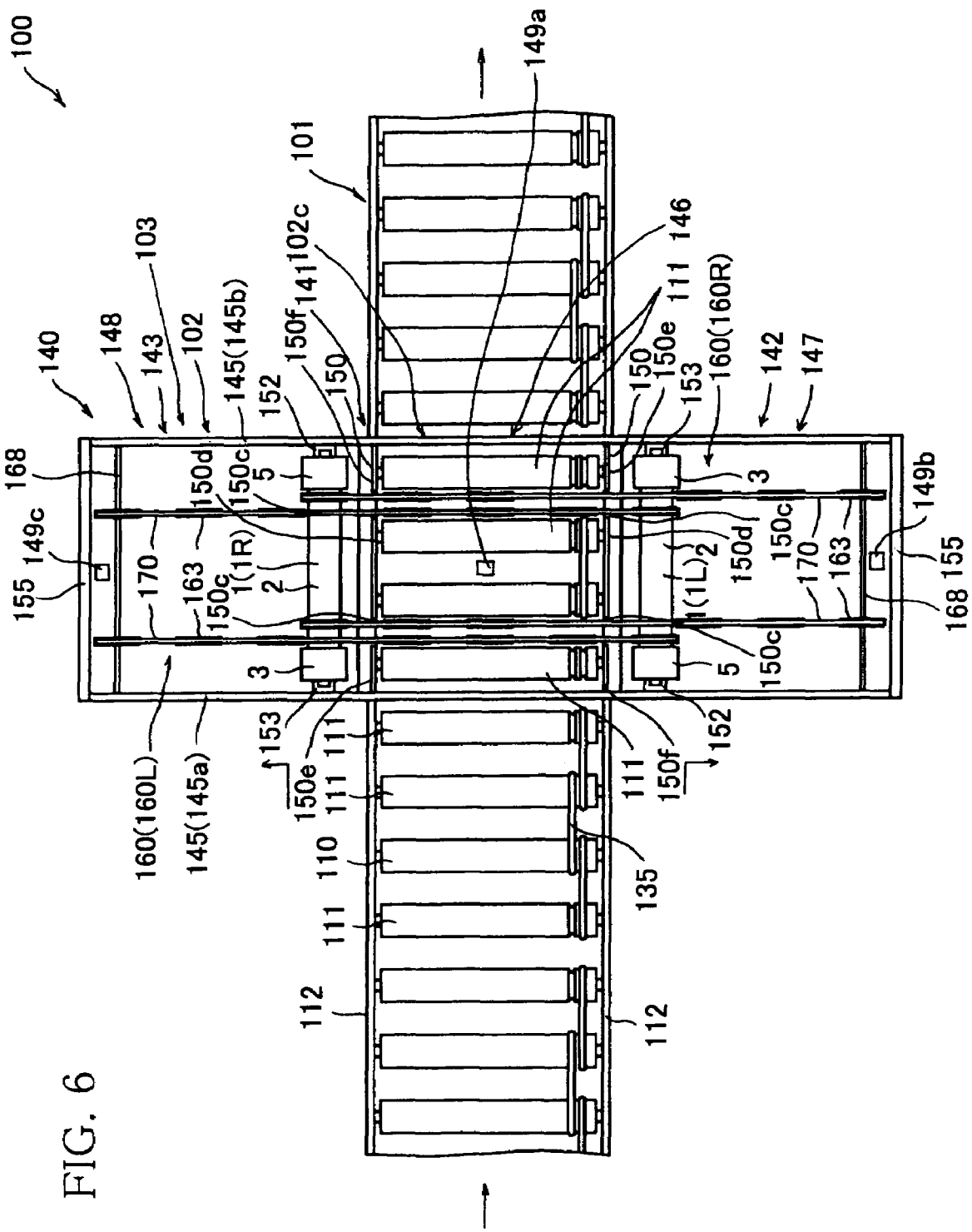
FIG. 6 is a plan view of a conveying apparatus incorporating a diverter and a diverting unit employing the driving device that is the preferred embodiment of the present invention.

The conveying apparatus 100, as shown in FIG. 6, consists essentially of the main conveyor line 101 and a diverting line 102 for diverting articles conveyed via the main conveyor line 101 to at least one side of the main conveyor line 101. The conveying apparatus 100 conveys articles downstream from an upstream of the diverting line 102 and diverts the articles moving down the main conveyor line 101 to the diverting line 102 as needed.

Figure 7:
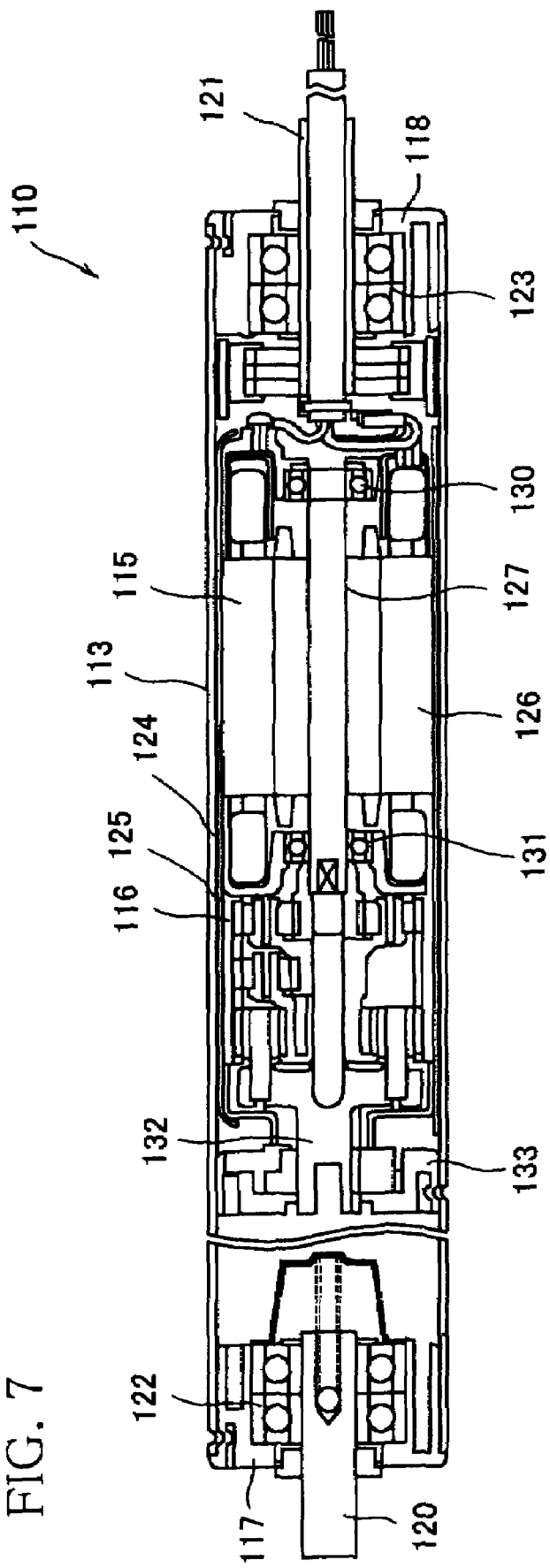
FIG. 7 is a sectional view of a motorized roller (i.e., a roller accommodating a motor therein) employed in the conveying apparatus shown in FIG. 6.

The main conveyor line 101 is formed by motorized rollers 110 each accommodating a motor and free rollers 111 arranged at specified intervals between a set of parallel side frames 112 and 112. Each of the motorized rollers 110, as shown in FIG. 7, substantially consists of a metal cylindrical casing 113 accommodating a motor 115 and a reducer 116. The cylindrical casing 113 has openings closed with closing members 117 and 118 at opposite ends, through which stationary shafts 120 and 121 protrude sideways. The cylindrical casing 113 is rotatably supported relative to the stationary shafts 120 and 121 by means of bearings 122 and 123 mounted on the inner sides of the closing members 117 and 118.

Referring to FIG. 7, a driving unit 124 is an integration of the motor 115 with the reducer 116 and accommodated in the cylindrical casing 113. The motor 115 is a brushless motor accommodating in an inner cylinder 125 a plurality of stators 126 made of electromagnets, a rotor 127 having magnetic poles, and a position detector (not shown). The stators 126 each, which are coils formed of a conducting wire wound around an iron core, are integrally secured to the inner cylinder 125. The rotor 127 is accommodated in the inner cylinder 125 to be coaxial with the inner cylinder 125. The rotor 127 has a first end rotatably supported relative to the stationary shaft 121 through a bearing 130, and a second end connected to the reducer 116 through a bearing 131. The position detector, which is constituted by such as a Hall IC that is an integration of a Hall element and a whole or a part of a power switching circuit, detects a pole position of the rotor 127.

The reducer 116 is composed of three-throw planetary gears and reduces a rotational speed of the rotor 127 of the motor 115 at predetermined reduction ratio to output to an output shaft 132. In the present embodiment, the reducer 116 has a structure as described above, but is not limited thereto and may be any device having a mechanism capable of reducing a rotational power of the motor 115.

The output shaft 132 of the reducer 116 is linked with the closing member 117 by a link 133. Thus, torque of the motor 115 is reduced by the reducer 116 and transmitted to the closing member 117 through the link 133. The cylindrical casing 113 is integrated with the closing member 117, so as to rotate around the stationary shafts 120 and 121 upon reception of the torque transmitted to the closing member 117.

The free roller 111 has such a structure as getting rid of the driving unit 124 composed of the motor 115 and the reducer 116 from the motorized roller 110 described above. More specifically, the free roller 111 is a roller without power source substantially consisting of a hollow cylindrical casing 113 having openings at opposite ends closed with the closing members 117 and 118 with the stationary shafts 120 and 121 inserted through the bearings 122 and 123, the cylindrical casing 113 being freely rotatable relative to the stationary shafts 120 and 121.

Referring to FIG. 6, the main conveyor line 101 is constituted by the motorized roller 110 and at least one free roller 111 spanned with a belt 135, through which a rotational power of the motorized roller 110 is transmitted to the free roller 111. A branch area 141 is formed on the line of the main conveyor line 101 for diverting articles moving down the main conveyor line 101 to the adjacent diverting line 102.

Referring to FIG. 6, the side frames 112 and 112 making up the main conveyor line 101 are divided by the diverting line 102 on the line in a conveying direction of articles. A diverting unit 103 making up the diverting line 102 includes a frame 140 extending in a direction substantially perpendicular to the side frames 112 and 112 and a pair of diverters 160 each incorporating the driving device 1 in the embodiment described above installed therein. The diverting line 102 substantially consists of the branch area 141 formed where it crosses the main conveyor line 101, a right diverting area 142 for diverting articles rightward of a moving direction of the articles moved down the main conveyor line 101, and a left diverting area 143 for diverting the articles leftward as well.

Figure 10:
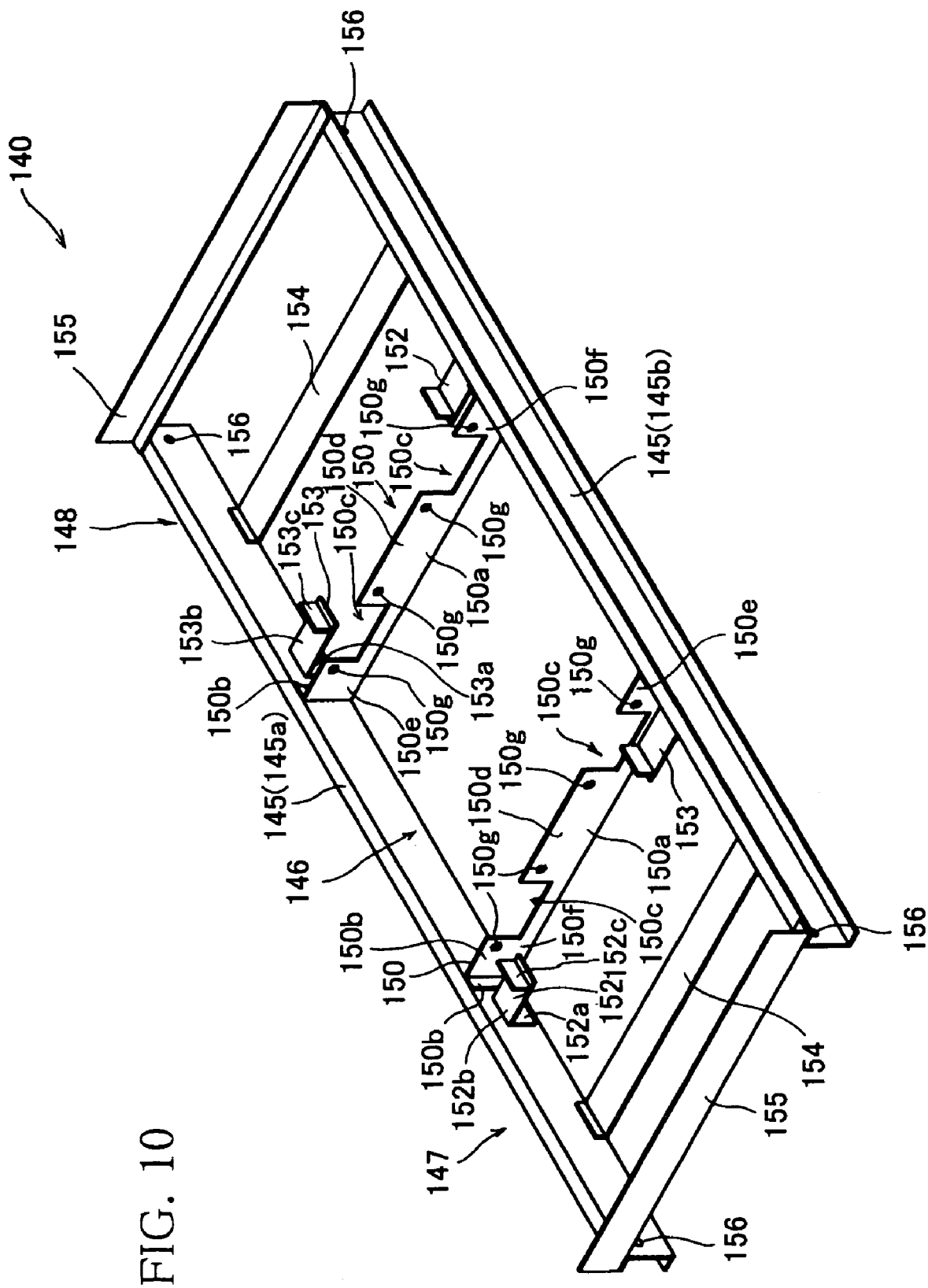
FIG. 10 is a perspective view of a frame that is a constituent of the diverting line shown in FIG. 6.

The frame 140, as shown in FIG. 10, has a set of parallel side frames 145 (hereinafter referred to as side frames 145a and 145b as needed) spaced out from each other, is symmetric with respect to a point as seen from above, and substantially consists of a central area 146 formed at the central area in a longitudinal direction of the side frames 145 and a right and a left areas 147 and 148 formed at either side of the central area 146 respectively. The frame 140 has article presence sensors 149a to 149b for detecting existence or nonexistence of articles at positions corresponding with the central area 146, the right area 147, and the left area 158 respectively. (in FIGS. 6 and 8)

The central area 146 has the motorized roller 110 and the free rollers 111 arranged substantially parallel to a longitudinal direction of the side frames 145 and constitutes the branch area 141. Roller fixtures 150 are attached to boundary areas between the central area 146 and the right area 147 and between the central area 146 and the left area 148 for securing the motorized roller 110 and the free rollers 111.

The roller fixture 150 is made of metal and, as shown in FIG. 10, includes a fixing portion 150a crossing between the side frames 145a and 145b and overlapping widths 150b for securing the roller fixture 150 to the side frames 145a and 145b. The fixing portion 150a includes two rectangular cutouts 150c and 150c in a width direction and shaft fixing portions 150d, 150e, and 150f at positions adjacent to the cutouts 150c and 150c. When the roller fixture 150 is fixed to the side frames 145a and 145b, as shown in FIG. 10, the shaft fixing portion 150d is disposed at a substantially central part between the side frames 145a and 145b, and the shaft fixing portions 150e and 150f are disposed adjacent to the side frames 145a and 145b respectively. The shaft fixing portion 150d has two shaft insertion holes 150g at a specified interval in a width direction of the roller fixture 150, while the shaft fixing portions 150e and 150f each have one shaft insertion whole 150g. The stationary shafts 120 and 121 of the motorized roller 110 and the free roller 111 are inserted in the shaft insertion holes 150g.

Figure 8:
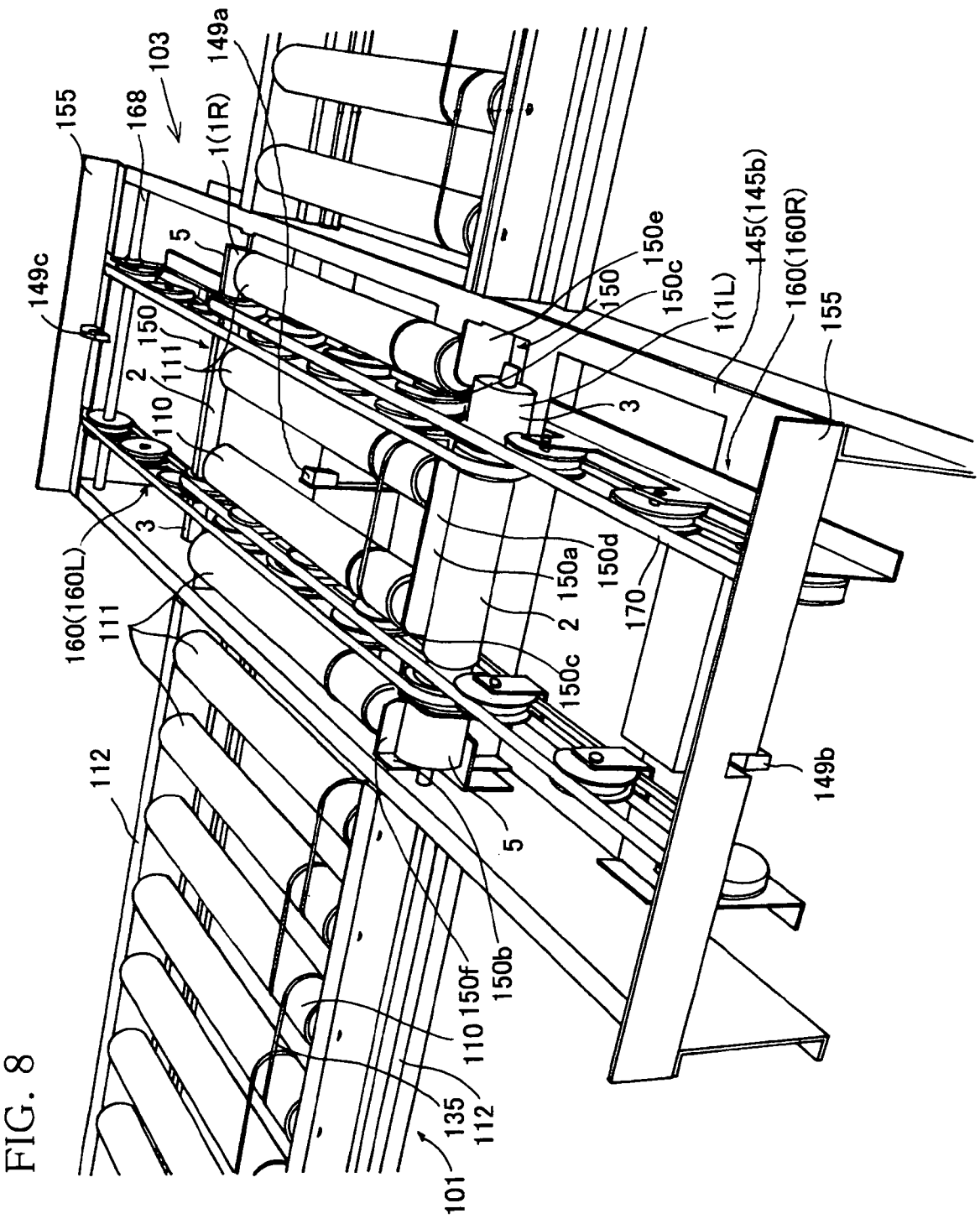
FIG. 8 is an enlarged perspective view of an essential portion of the conveying apparatus shown in FIG. 6.

Referring to FIGS. 6 and 8, the roller fixtures 150 and 150 are attached to the side frames 145a and 145b at a specified interval. One each of the free rollers 111 is mounted between the shaft fixing portions 150e and 150f of one of the roller fixtures 150 and the shaft fixing portions 150f and 150e of the other of the roller fixtures 150 respectively. One motorized roller 110 and one free roller 111 are mounted between the shaft fixing portions 150d and 150d situated at the substantially central part between the side frames 145a and 145b. Each of the cylindrical casings 113 of the motorized roller 110 and the free rollers 111 mounted at the branch area 141 of the frame 140 extends in a direction substantially parallel with that of the side frames 145 and the motorized rollers 110 and the free rollers 111 mounted at the main conveyor line 101. Consequently, the branch area 141 functions as a transit line for transferring an article moving down an upstream of the main conveyor line 101 above the branch area 141 to a downstream of the main conveyor line 101.

Referring to FIG. 10, the right and the left areas 147 and 148 have supports 152 and 153 for underpropping the driving device 1 at positions adjacent to the roller fixtures 150 and 150. The support 152 is composed of a fixing face 152a, a seat 152b substantially vertical to the fixing face 152a, and a supporting plate 152c protruding substantially vertical to the seat 152b. The support 152 is cantilevered in such a manner that the supporting plate 152c faces upward by securing the fixing face 152a to the side face of the side frame 145. The cuboid supporting plate 152c protrudes upward from the seat 152b with such a size as fitting in the opening 88 of the driving device 1.

The support 153 is, as well as the support 152 described above, composed of a fixing face 153a, a seat 153b, and a supporting plate 153c. The support 153 has the same size and shape of the fixing face 153a and the supporting plate 153c as those of the fixing face 152a and the supporting plate 152c of the support 152 described above, whereas the seat 153b has a length longer than that of the seat 152b, that is, a distance between the fixing face 153a and the supporting plate 153c is longer than a distance between the fixing face 152a and the supporting plate 152c. The support 153 is attached to the other side frame 145 facing to the side frame 145 where the support 152 is attached, the supports 152 and 153 being facing to each other.

The supports 152 and 153 are arranged one each at both the right and the left areas 147 and 148 and secured to the side frames 145 and 145 facing to each other. More specifically, the right area 147 has the support 152 secured to the side frame 145a and the support 153 secured to the side frame 145b. On the other hand, the left area 148 has the support 153 secured to the side frame 145a and the support 152 secured to the side frame 145b. Therefore, the supporting plates 152c and 153c of the supports 152 and 153 secured to the right area 147 is situated near the side frame 145a in relation to the supporting plates 152c and 153c of the supports 152 and 153 secured to the left area 148.

A reinforcing plate 154 spanned between the side frames 145 and 145 adds to the strength of the frame 140. The side frames 145 and 145 are spanned with stopping plates 155 having a substantially L-shaped cross section at its opposite ends in a longitudinal direction and on the upper surfaces.

The stopping plates 155 prevents an article diverted from the branch area 141 to the right diverting area 142 or the left diverting area 143 from runaway. The side frames 145 and 145 have shaft insertion holes 156 for inserting shafts 168 (viz., frame shaft) of the diverters 160 described below therethrough at the side faces of its opposite ends.

Referring to FIGS. 6 and 8, the diverting unit 103 is substantially made up of a pair of the diverters 160 having opposite diverting directions integrated on the frame 140. More specifically, the frame 140 includes the diverter 160 (hereinafter referred to as a diverter 160R as needed) for diverting an article toward the right diverting area 142 and the diverter 160 (hereinafter referred to as a diverter 160L as needed) for diverting an article toward the left diverting area 143. The diverters 160R and 160L are of the same shape and size, and respectively straddle from either the right diverting area 142 or the left diverting area 143 to the branch area 141. The diverters 160R and 160L are integrated on one frame 140 with some parts doubled, thereby enabling a space-saving.

The diverter 160 operates with the driving device 1 described above, and employs the main roller 2 of the driving device 1 as power source for diverting conveyers 165 and 165 (viz., conveying devices) described below and the eccentric members 74 and 74 accommodated in the casings 3 and 5 as lifting devices for lifting up and down the diverting conveyors 165 and 165.

Figure 11:
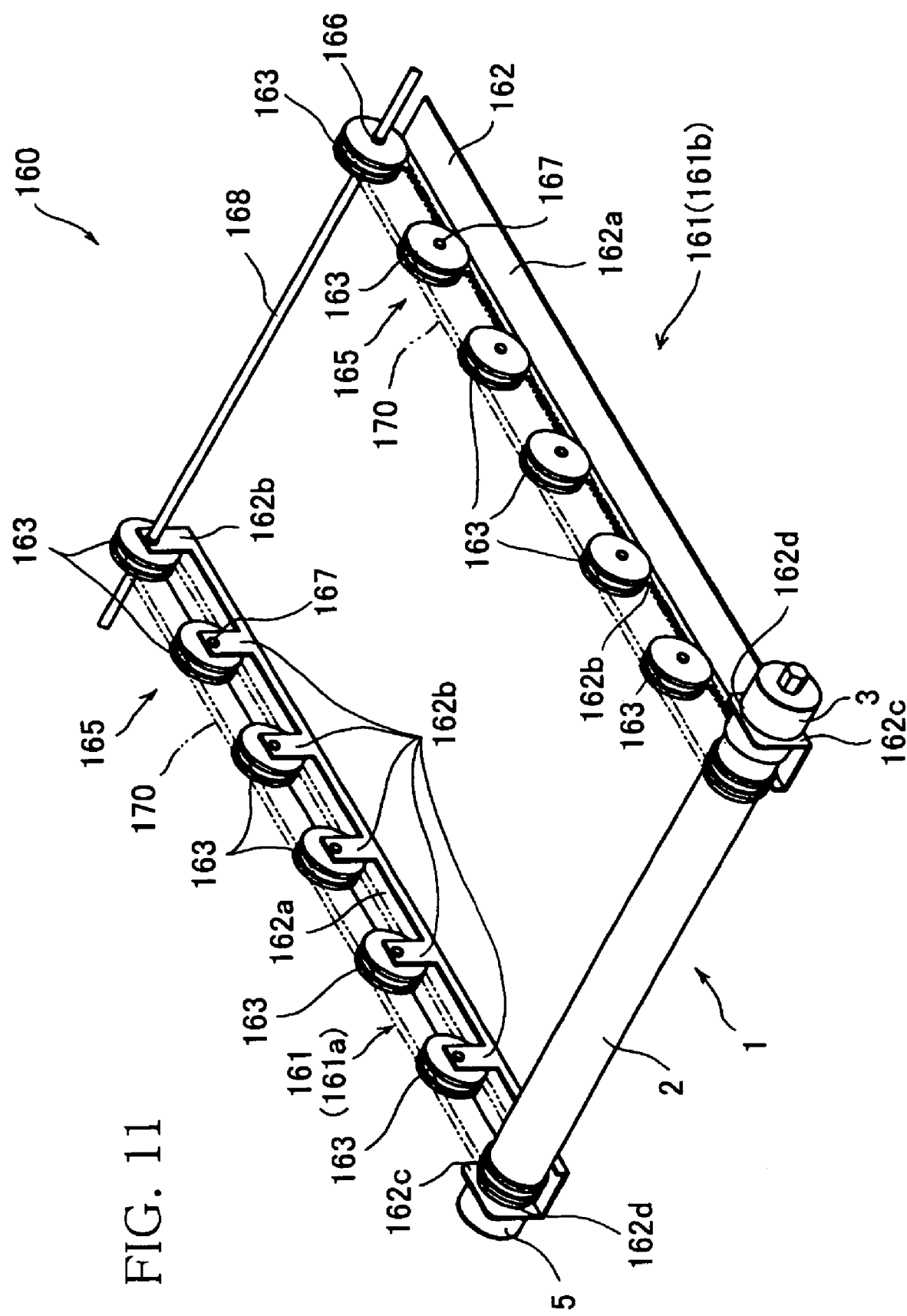
FIG. 11 is a perspective view of the diverter employed in the diverting line shown in FIG. 6.

The diverter 160, as shown in FIG. 11, has a pair of supporting arms 161 (hereinafter referred to as supporting arms 161a and 161b as needed) placed opposite, with the driving device 1 mounted to the supporting arms 161a and 161b on their distal ends. Referring to FIG. 11, each of the supporting arm 161 includes a long arm 162 equipped with a plurality of pulleys 163 (six pulleys in the present embodiment) and the driving device 1. The arm 162 has an arm plate 162a with a shape of a long narrow plate, six pulley supporting plates 162b standing upright against the arm plate 162a, and a roller supporting plate 162c. One of the pulley supporting plates 162b at a proximal end of the arm 162 supports one of the pulleys 163 rotatably by means of a sleeve 166. The supporting arms 161a and 161b are rotatably supported relative to the shaft 168 (viz., frame shaft) inserted through the sleeves 166 supporting each one of the pulleys 163 at a proximal end of the arm plates 162a. The other five pulleys 163 on one arm plate 162a are rotatably mounted to the supporting plates 162b respectively by means of pins 167. The six pulleys 163 mounted to the pulley supporting plates 162b line up behind each other in a longitudinal direction of the arm plate 162a.

The roller supporting plate 162c has a shaft insertion hole 162d for inserting the main shaft 17 of the driving device 1. The roller supporting plate 162c is attached instead of the closing member 72 of the driving device 1 described above to close the end of the cylindrical casing 71. The driving device 1, as shown in FIGS. 15A and 16A, is unrotatably supported relative to the supporting arms 161a or 161b by inserting the shaft 17 through the shaft insertion hole 162d of the roller supporting plate 162c. In this state, the driving device 1 is arranged in such a manner that each of the openings 88 of the casings 3 and 5 is exposed without hiding behind the arm plate 162a viewing from under the arm plate 162a and that the belt carrying member 65 or 66 of the main roller 2 lines up behind the pulleys 163 supported by the pulley supporting plate 162b. As indicated by a chain double-dashed line in FIG. 11, six pulleys 163 lined up along the arm plate 162a and the belt carrying member 65 or 66 spanned by a belt 170, thereby making up the diverting conveyer 165 (viz., the conveying device).

Figure 9:
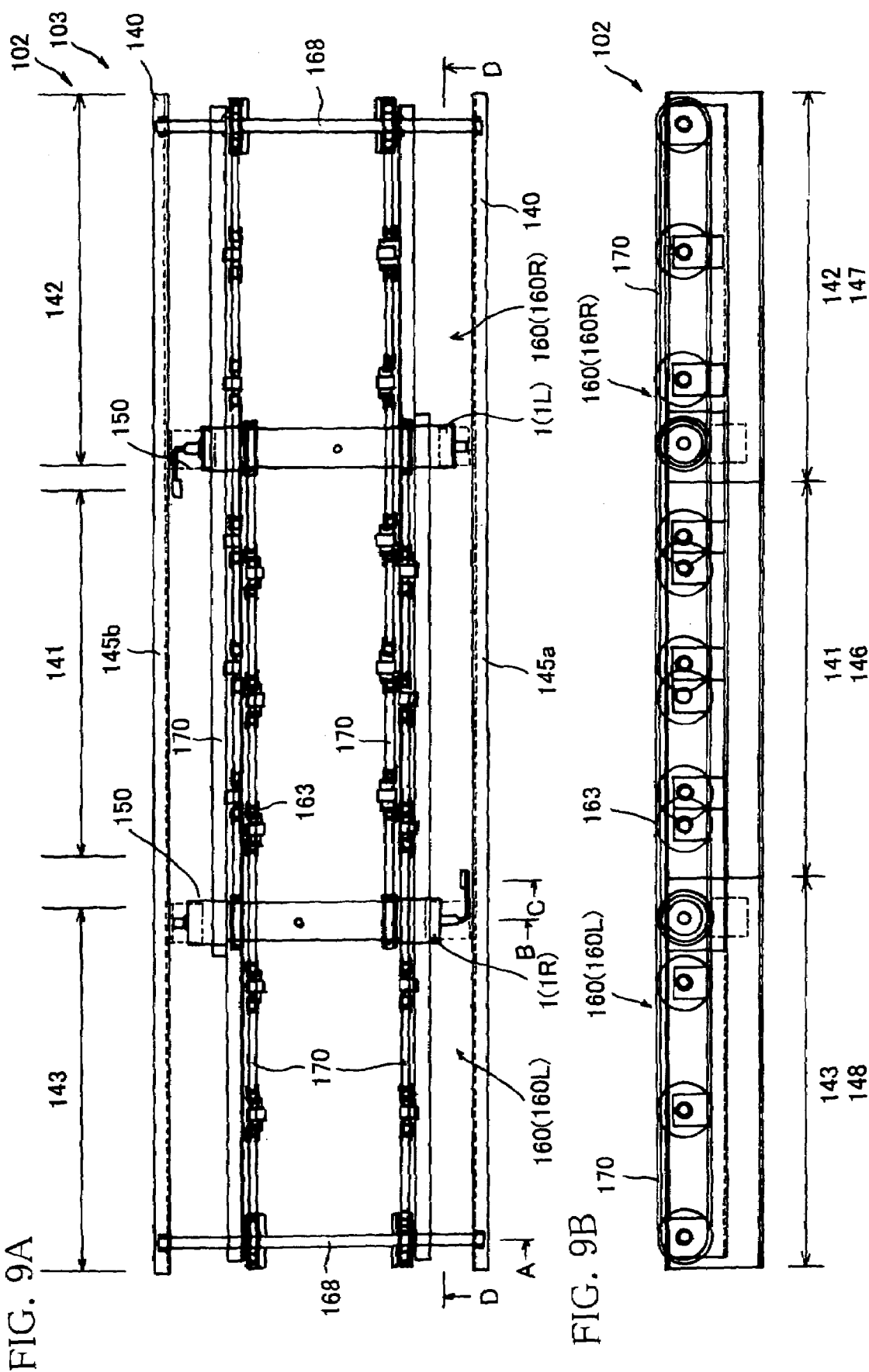
FIGS. 9A and 9B illustrate a diverting line that is a constituent of the conveying apparatus shown in FIG. 6, FIG. 9A being a plan view thereof, FIG. 9B being a sectional view thereof.

The diverters 160R and 160L, as shown in FIGS. 6, 8, and 9, are mounted to both of the right and the left areas 147 and 148 of the frame 140. More specifically, the diverter 160 is attached to the frame 140 with the shaft 168 inserted through the shaft insertion holes 156 and 156 (in FIG. 10) formed at the proximal end of the side frames 145a and 145b in either the right area 147 or the left area 148 of the frame 140, and the driving device 1 put on the supports 152 and 153 secured to the distal end of the side frames 145a and 145b in either the right area 147 or the left area 148 of the frame 140. Consequently, the diverters 160R and 160L, as shown in FIG. 6, have the supporting arms 161 and the belts 170 crossing the central area 146 from either of the right area 147 or the left area 148 of the frame 140, the diverter 160R having the driving device 1 (1R) at the left area 148, the diverter 160L having the driving device 1 (1L) at the right area 147.

Figure 12:
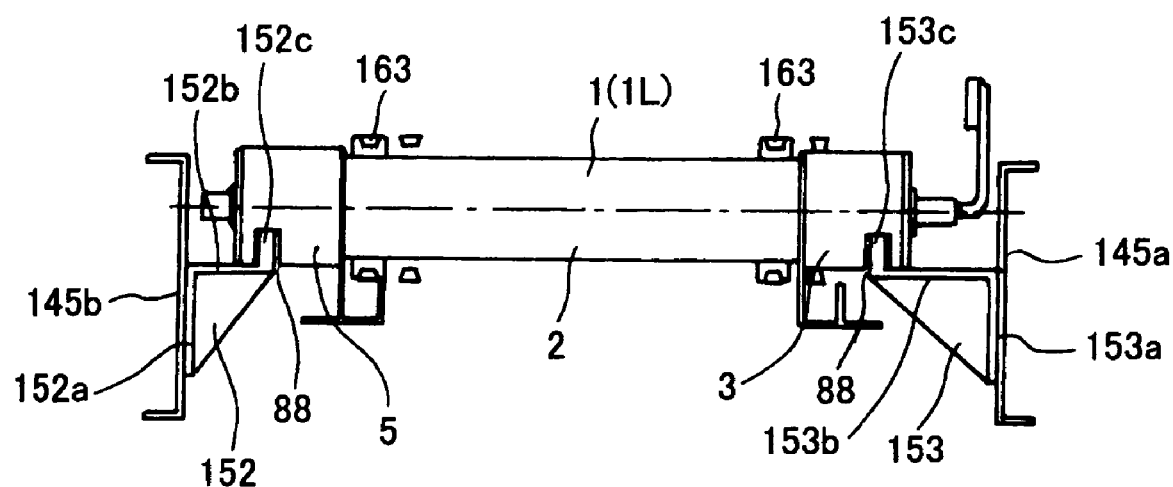
FIG. 12 is a cross-sectional view taken along B-B line of FIG. 9A.
Figure 13:
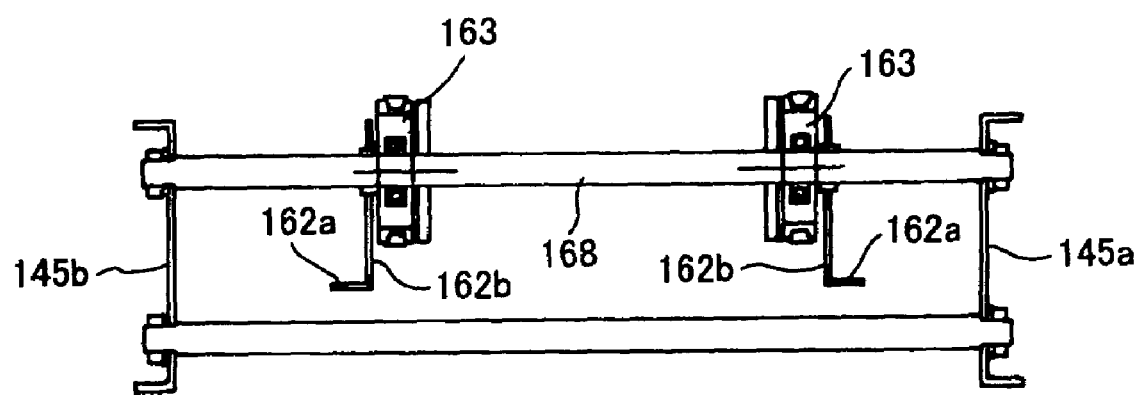
FIG. 13 is a cross-sectional view taken along A-A line of FIG. 9A.
Figure 14:
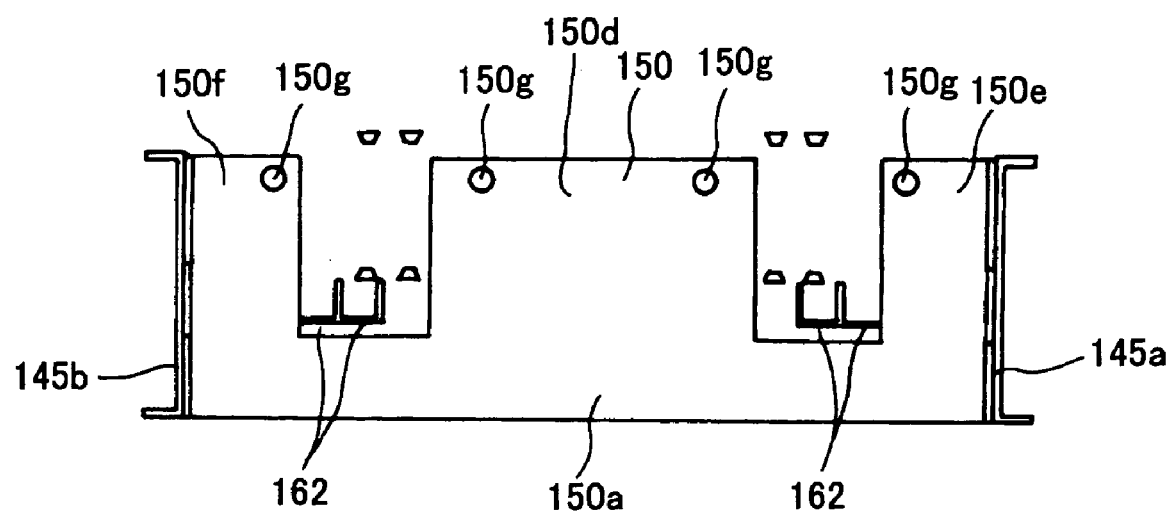
FIG. 14 is a cross-sectional view taken along C-C line of FIG. 9A.

The driving device 1, as shown in FIG. 6, is mounted with the casing 5 facing to the support 152 and the casing 3 facing to the support 153. Referring to FIG. 12, the driving device 1 is arranged in such a manner that the openings 88 and 88 of the casings 3 and 5 are fitted with the supporting plates 152c and 153c of the supports 152 and 153. In this state, the supporting arms 161a and 161b of the diverter 160, as shown in FIGS. 6 and 10, are respectively received in the cutouts 150c and 150c formed between the shaft fixing portions 150d and 150e and between the shaft fixing portions 150d and 150f of the roller fixtures 150 and 150, and cross the branch area 141.

The conveying apparatus 100 includes the controller (not shown) for controlling operation of the motorized rollers 110 functioning as power sources for the main conveyor line 101 and the driving device 1 functioning as a power source for the diverters 160.

Now, operation of the conveying apparatus 100 in the present embodiment is described in detail below, making reference to the accompanying drawings. Upon putting the articles on the main conveyor line 101, electric power is supplied to the motorized roller 110 in response to a control by the controller not shown. The energized motorized roller 110 starts to rotate. In unison with this rotation, the power of the motorized roller 110 is transmitted to the free rollers 111 via the belt 135 to start rotation of the free rollers 111, so that the articles on the main conveyor line 101 are conveyed downstream as indicated by an arrow in FIG. 6.

Before an article moved down the main conveyor line 101 reaches the branch area 141, the controller not shown has determined whether to convey the article downstream of the branch area 141 or to operate the diverter 160R or 160L incorporated in the diverting line 102 so as to divert the article to the right diverting area 142 or the left diverting area 143. Herein, in the case of determining to convey the article downstream of the branch area 141, the controller sequentially operates the motorized rollers 110 incorporated in the branch area 141 and in the main conveyor line 101 downstream thereof, draws the article into the branch area 141, and then transfers it to the main conveyor line 101 further downstream.

On the other hand, in the case of determining to divert the article to the right diverting area 142 or the left diverting area 143, the controller operates the motorized roller 110 incorporated in the branch area 141, draws the article into the branch area 141, then operates either of the diverters 160R and 160L mounted to the frame 140.

More specifically, in the case of diverting an article conveyed through the main conveyor line 101 to the right diverting area 142, for example, upon detection of arrival of the article to the branch area 141 by the article presence sensor 149a installed in the branch area 141, the controller halts energization of the motorized roller 110 incorporated in the branch area 141, thereby stopping the article at the branch area 141. Then, the controller supplies power to the driving device 1 (hereinafter referred to as the driving device 1R as needed) that is a constituent of the diverter 160R.

While the diverter 160R holds steady in a standby mode, the eccentric members 74 accommodated in the casings 3 and 5 of the driving device 1R have the top portions 74a above the cylindrical casings 71, and the supporting plates 152c and 153c of the supports 152 and 153 fit in the openings 88 (in FIG. 15A). Consequently, the eccentric members 74 are rotatable in the casings 3 and 5 during a standby mode of the diverter 160R.

Upon arrival of the article on to the branch area 141, the weight of the article acts on the main roller 2 of the driving device 1R via the supporting arm 161 of the diverter 160R, thereby inhibiting the main roller 2 from rotating. Consequently, in the state of the article on the branch area 141, the energized driving device 1R necessarily causes the first planetary gear mechanisms 12 and 13 accommodated in the main roller 2 to form a planetary type. That brings about transmission of the power of the motor 11 accommodated in the main roller 2 to the eccentric members 74 via the rotational shafts 27 and the planet gears 77 of the second planetary gears 70, thereby starting eccentric rotation of the eccentric members 74 relative to the shaft 17.

Upon eccentric rotation of the eccentric members 74, the top portions 74a gradually approach the openings 88, so that the eccentric portions 82 move near downward of the shaft 17. Then, the supporting plates 152c and 153c of the supports 152 and 153 inserted in the cylindrical casings 71 through the openings 88 are gradually uncoupled from the cylindrical casings 71, so that the driving device 1R is lifted up above the supports 152 and 153.

When the driving device 1 is lifted up as described above, as shown in FIG. 16B, the diverter 160R inclines on the shaft 168 mounted to the right diverting area 142. Due to inclination of the diverter 160R, a conveying plane of the diverting conveyors 165 and 165 made up of the belts 170 and 170 over the supporting arms 161 and 161 is exposed in the inclined state, thereby scooping up the article on the branch area 141 on the conveying plane. This state forms at the diverting conveyors 165 a downward pitch from an upstream in a moving direction of the article, that is, a side of the driving device 1 to a downstream in the moving direction.

When the eccentric members 74 eccentrically rotate until the abutting portions 90 thereof will have come into contact with the abutting portions 73a attached on the lower side of the closing members 73, as shown in FIG. 16A, the driving device 1 projects above the top face of the side frames 145a and 145b. When the abutting portions 90 abut to the abutting portions 73a, the eccentric members 74 in the casings 3 and 5 are inhibited from rotating further more. Thus, the planet gears 77 of the second planetary gear mechanisms 70 accommodated in the casings 3 and 5 and the power transmitting members 50 engaging with the planet gears 77 become stationary, not rotating at all, so that the arms of the planet gears 40 of the first planetary gear mechanisms 12 and 13 becomes stationary. That switches the first planetary gear mechanisms 12 and 13 to a star type, thereby transmitting the torque of the motor 11 to the cylinder 10 via the internal gears 41. Consequently, in the diverter 160, the main roller 2 starts rotation when the driving device 1 projects above as shown in FIG. 16A.

Upon starting rotation of the main roller 2, the belts 170 and 170 carried by the main roller 2 start operation, thereby diverting the article on the branch area 141 to the right diverting area 142.

When the article presence sensor 149b installed in the right diverting area 142 detects arrival of the article at the right diverting area 142, the controller halts to supply power to the motor 11 and stops conveyance of the article. Then the controller makes reverse rotation of the motor 11 in order to bring the diverter 160R back to its original position.

Referring to FIG. 16A, in the state of the driving device 1 projecting above, the eccentric members 74 is inhibited from rotating in a positive direction by the abutting portions 73a, but is allowed to freely rotate in the reverse direction. Consequently, with starting reverse rotation of the motor 11, the torque of the motor 11 is transmitted to the eccentric members 74 via the planet gears 40 and the power transmitting members 50 of the first planetary gear mechanisms 12 and 13 and the planet gears 77 of the second planetary gear mechanisms 70, thereby rotating the eccentric members 74 in the reverse direction. Due to reverse rotation of the eccentric members 74, the top portions 74a gradually move away from the openings 88, so that the eccentric portions 82 come above the shaft 17. Consequently, the supporting plates 152c and 153c of the supports 152 and 153 proceeds into the cylindrical casings 71 through the openings 88, so as to start a descent of the driving device 1.

The motor 11 starts to reverse rotation whereupon the controller of the driving device 1 counts pulse signals outputted from the position detector 23. With predetermined total number of the pulse signals outputted from the position detector 23 counted, and with the eccentric members 74 and the bearings 84 enclosing therearound come to the position farthest from the openings 88, the diverter 160R takes a horizontal position, as shown in FIG. 15B. At this moment, the conveying plane made up of the belts 170 and 170 is situated below the conveying plane made up of the motorized rollers 110 and the free rollers 111 incorporated in the branch area 141 and the main conveyor line 101. Thus, a sequential operation to divert an article is completed.

As noted above, the diverter 160L has the same structure as the diverter 160R, so that the conveying apparatus 100 diverts an article to the left diverting area 143 by means of the diverter 160L operated just as the diverter 160R described above.

The diverter 160 employed in the present embodiment uses the driving device 1, rendering a compact system structure. The diverter 160 employs the driving device 1 as a power source for lifting up and down the conveying plane made up of the belts 170 and 170, thereby enabling smooth lifting operation.

The diverting unit 103 is formed by mounting the diverter 160 to the frame 140 with a consequence of facilitating addition to existing lines. Further, the diverting unit 103 is constituted by the diverters 160R and 160L in opposite directions integrated on the same frame 140 with a consequence of a more compact system structure.

As already noted above, the driving device 1 is constituted in such a manner that the first planetary gear mechanisms 12 and 13 in the main roller 2 are switched to a star type to use the power of the motor 11 for rotation of the main roller 2 without transmitting to the casings 3 and 5 in the state of the abutting portions 90 of the eccentric members 74 abutting to the abutting portion 73a provided on the lower side of the closing members 73. Therefore, the diverter 160 continues rotation of the main roller 2 until an article has diverted to the right diverting area 142 or the left diverting area 143 with the driving device 1 situated at its upper position.

The present embodiment described above illustrates the driving device 1 being lifted up and down relative to the supports 152 and 153 by eccentric rotation of the eccentric members 74 relative to the shaft 17, but the conveying apparatus 100 is not limited to such an arrangement. More specifically, the lifting device 160 may have instead of the eccentric member 74 of the driving device 1 a rotational member coaxial with the shaft 17, via which member the power is brought out of the casings 3 and 5 to lift up and down the diverter 160.

The diverter 160 has at only one end of the supporting arms 161 the driving device 1 that is lifted up and down to make up of the conveying plane inclined to the right diverting area 142 or the left diverting area 143, thereby requiring small energy to scoop up an article or to divert it to the right diverting area 142 or the left diverting area 143.

The driving device, as described above, smoothly switches the power transmitting system to transmit power of the motor 11 in response to a load acting on the eccentric member 74 and operates the main roller 2 over a desired period of time. Consequently, the diverter 160 in the present embodiment makes it sure to divert an article moved down the main conveyor line 101 with certainty as needed.

In the present embodiment, the diverter 160 has at only one end of each of the supporting arms 161 the driving device 1 that is lifted up and down to make up the conveying plane inclined to the right diverting area 142 or the left diverting area 143, but may have at opposite ends of the supporting arms 161 the driving device 1, whereby lifting up and down with the conveying plane held horizontal.

Further, the diverting unit 103 may be formed by the diverter 160 in either right or left direction mounted to the frame 140.

It is to be understood that the present invention is not limited to the details of construction and arrangement of parts illustrated in the preferred embodiment described, since changes and variations may be made without departing from the spirit or scope of the invention.

The invention claimed is:

1. A driving device comprising:
   a shaft having a central axis;
   a main body supported by the shaft; and
   at least one side body provided at the side of the main body and supported by the shaft;
   wherein the main body comprises a roller supported rotatably relative to the shaft and around the central axis of the shaft, and a motor, a first planetary gear mechanism and a power transmitting member all accommodated in the roller, and
   wherein the side body comprises a casing supported unrotatably relative to the shaft, and a second planetary gear mechanism and a rotational member both accommodated in the casing,
   each of the power transmitting member and the rotational member being supported rotatably relative to the shaft,
   the first planetary gear mechanism comprising a first sun gear, a first planet gear disposed at the outer side of the first sun gear, and a first internal gear disposed at the outer side of the first planet gear,
   wherein the first planet gear is arranged to engage with the first sun gear and the first internal gear,
   wherein the first internal gear is arranged in the roller unrotatably relative to the roller, and
   wherein the first sun gear is adapted to rotate relative to the shaft and around the central axis of the shaft upon reception of torque generated by the motor,
   the power transmitting member having a first projection extending out in a direction along the shaft for supporting the first planet gear rotatably relative to the first projection,
   the rotational member having a second projection extending out in a direction along the shaft,
   the second planetary gear mechanism comprising a second sun gear, a second planet gear disposed at the outer side of the second sun gear, and a second internal gear disposed at the outer side of the second planet gear,
   wherein the second sun gear is connected to the power transmitting member and arranged to rotate integrally therewith,
   wherein the second internal gear is arranged in the casing unrotatably relative to the casing, and
   wherein the second planet gear is supported rotatably relative to the rotational member and around the central axis of the second projection.

2. The driving device as defined in claim 1,
   wherein the rotational member and the casing each have an abutting portion,
   the rotational member being inhibited from rotating relative to the shaft after rotating toward a predetermined angular position relative to the shaft by abutment of the abutting portion of the rotational member to that of the casing.

3. The driving device as defined in claim 1,
   wherein the first sun gear, the first planet gear, the first internal gear, the second sun gear, the second planet gear, the second internal gear, the power transmitting member, and the rotational member each have a rotational axis extending out in a direction substantially along the shaft.

4. The driving device as defined in claim 1,
   wherein the rotational member is supported eccentrically rotatably.

5. The driving device as defined in claim 1,
   wherein a pair of the side bodies are arranged adjacent to the opposite ends of the main roller.

6. The driving device as defined in claim 1,
   wherein the rotational member is accommodated in the casing of the side body,
   the casing having an opening at an axial position corresponding to the rotational member.

7. A driving device comprising:
   a shaft having a central axis;
   a main body supported by the shaft; and
   at least one side body provided at the side of the main body and supported by the shaft;
   wherein the main body comprises a roller supported rotatably relative to the shaft and around the central axis of the shaft, and a motor, a first planetary gear mechanism and a power transmitting member all accommodated in the roller, and
   wherein the side body comprises a casing supported unrotatably relative to the shaft, and a second planetary gear mechanism and a rotational member both accommodated in the casing,
   the power transmitting member being supported rotatably relative to the shaft,
   the second planetary gear mechanism being adapted to make up a planetary-type planetary gear mechanism, the rotational member being adapted to have a state selected from states in which the rotational member is rotatable and unrotatable relative to the shaft, when the rotational member is rotatable relative to the shaft, the first planetary gear mechanism being adapted to make up a planetary-type planetary gear mechanism whereby torque of the motor is transmitted to the rotational member to rotate the member relative to the shaft, and when the rotational member is unrotatable relative to the shaft, the first planetary gear mechanism being adapted to make up a star-type planetary gear mechanism whereby torque of the motor is transmitted to the first internal gear to rotate the roller around the central axis of the shaft.

8. The driving device as defined in claim 7, being adapted to inhibit the rotational member from rotating further more upon rotation of the member towards a predetermined angular position relative to the shaft, but to allow the member to rotate in a reverse direction.

9. A diverter comprising:

a conveying device for conveying articles;

a supporting member for supporting the conveying device;

a lifting device for lifting up and down the supporting member; and a driving device for transmitting power to the conveying device and the lifting device, wherein the driving device is constituted by a unit including a motor and a power transmitting mechanism, the power transmitting mechanism being adapted to be switched in response to a load acting on the conveying device and/or the lifting device so as to transmit power of the motor to either of the conveying device and the lifting device, and wherein the supporting member is lifted up by means of the lifting device so as to incline the conveying device in a diverting direction.

10. A diverter comprising:

a conveying device for conveying articles;

a supporting member for supporting the conveying device;

a lifting device for lifting up and down the supporting member; and a driving device for supplying power to one selected from the group of the conveying device and the lifting device, the driving device comprising a shaft having a central axis, a main body supported by the shaft, and at least one side body provided at the side of the main body and supported by the shaft, wherein the main body comprises a roller supported rotatably relative to the shaft and around the central axis of the shaft, and a motor, a first planetary gear mechanism and a power transmitting member all accommodated in the roller, and is adapted to supply power to the conveying device by means of the roller, and wherein the side body comprises a casing supported unrotatably relative to the shaft, and a second planetary gear mechanism and a rotational member both accommodated in the casing, and is adapted to supply power to the lifting device by means of rotational member, the power transmitting member being supported rotatably relative to the shaft, the second planetary gear mechanism being adapted to make up a planetary-type planetary gear mechanism, the rotational member being adapted to have a state selected from states in which the rotational member is rotatable and unrotatable relative to the shaft, when the rotational member is rotatable relative to the shaft, the first planetary gear mechanism being adapted to make up a planetary-type planetary gear mechanism whereby torque of the motor is transmitted to the rotational member to rotate the member relative to the shaft, and when the rotational member is unrotatable relative to the shaft, the first planetary gear mechanism being adapted to make up a star-type planetary gear mechanism whereby torque of the motor is transmitted to the first internal gear to rotate the roller around the central axis of the shaft.

11. A diverter comprising:

a conveying device for conveying articles;

a supporting member for supporting the conveying device;

a lifting device for lifting up and down the supporting member; and a driving device for supplying power to one selected from the group of the conveying device and the lifting device, the driving device comprising a shaft having a central axis, a main body supported by the shaft, and at least one side body provided at the side of the main body and supported by the shaft, wherein the main body comprises a roller supported rotatably relative to the shaft and around the central axis of the shaft, and a motor, a first planetary gear mechanism and a power transmitting member all accommodated in the roller, and is adapted to supply power to the conveying device by means of the roller, and wherein the side body comprises a casing supported unrotatably relative to the shaft, and a second planetary gear mechanism and a rotational member both accommodated in the casing, and is adapted to supply power to the lifting device by means of the rotational member, each of the power transmitting member and the rotational member being supported rotatably relative to the shaft, the first planetary gear mechanism comprising a first sun gear, a first planet gear disposed at the outer side of the first sun gear, and a first internal gear disposed at the outer side of the first planet gear, wherein the first planet gear is arranged to engage with the first sun gear and the first internal gear, wherein the first internal gear is arranged in the roller unrotatably relative to the roller, and wherein the first sun gear is adapted to rotate relative to the shaft and around the central axis of the shaft upon reception of torque generated by the motor, the power transmitting member having a first projection extending out in a direction along the shaft for supporting the first planet gear rotatably relative to the first projection, the rotational member having a second projection extending out in a direction along the shaft, the second planetary gear mechanism comprising a second sun gear, a second planet gear disposed at the outer side of the second sun gear, and a second internal gear disposed at the outer side of the second planet gear, wherein the second sun gear is connected to the power transmitting member and arranged to rotate integrally therewith, wherein the second internal gear is arranged in the casing unrotatably relative to the casing, and wherein the second planet gear is supported rotatably relative to the rotational member and around the central axis of the second projection.

12. The diverter as defined in claim 11, the lifting device including the rotational member supported eccentrically rotatably, and the outer edge of the rotational member being directly or indirectly supported by a support so that the lifting device lifts up and down the supporting member in response to rotation of the rotational member.

13. The diverter as defined in claim 12, wherein the supporting member is lifted relative to the support so as to incline the conveying device in a diverting direction.

14. The diverter as defined in claim 11, wherein the rotational member is accommodated in the casing of the side body, the casing having an opening at an axial position corresponding to the rotational member.

15. The diverter as defined in claim 11, wherein a pair of the side bodies are arranged adjacent to the opposite ends of the main roller.

16. The diverter as defined in claim 11, wherein the conveying device comprises a belt carried by the main roller.

17. A diverting unit comprising:

a frame having a frame shaft and a support; and the diverter as defined in claim 11 mounted to the frame, the driving device being supported by the support, wherein the supporting member has a downstream end in a conveying direction of the conveying device supported rotatably relative to the frame by means of the frame shaft, and an upstream end supported by the driving device, and wherein the driving device is adapted to be lifted up and down relative to the support.

18. A diverting unit comprising:

a frame having a frame shaft and a support; and a pair of the diverters as defined in claim 11 mounted to the frame and adapted to divert articles in opposite directions, each of the diverter having: the driving device supported by the support and adapted to be lifted up and down relative to the support; and the supporting member that has a downstream end in a conveying direction of the conveying device supported rotatably relative to the frame by means of the frame shaft and an upstream end supported by the driving device.

19. A conveying apparatus comprising:

a conveyor line for conveying articles in a predetermined direction;

a branch line for diverting articles in an intersecting direction with the conveying direction of the articles on the conveyor line; and a branch area formed at the intersection of the conveyor line with the branch line, wherein the branch area is adapted to install the diverter as defined in claim 11 in such a manner that a conveying direction of the conveying device conforms to a diverting direction at the branch line.

20. The conveying apparatus as defined in claim 19, wherein the driving device is lifted up relative to the support so that the conveying device of the diverter is inclined toward the branch line away from the conveyor line.

21. The conveying apparatus as defined in claim 19, wherein the diverter has the driving device and the lifting device arranged at an upstream side in the conveying direction of the conveying device, and a downstream side of the diverter being supported rotatably by means of a frame shaft, the conveying device being arranged to cross the branch area.

22. The conveying apparatus as defined in claim 19, wherein the branch line further comprises a frame having a frame shaft and extending out in an intersecting direction with the conveyor line, the frame further having a support, whereby the driving device is supported, wherein the supporting member has a downstream end in a conveying direction of the conveying device supported rotatably relative to the frame by means of the frame shaft, and an upstream end supported by the driving device, and wherein the driving device is adapted to be lifted up and down relative to the support.

23. The conveying apparatus as defined in claim 22, the lifting device including the rotational member supported eccentrically rotatably, and the outer edge of the rotational member being directly or indirectly supported by the support so that the lifting device lifts up and down the supporting member in response to rotation of the rotational member.

24. The conveying apparatus as defined in claim 19, the conveyor line having a plurality of rollers arranged at specified intervals, wherein the supporting member of the diverter is arranged to be lifted up and down between the rollers arranged at the branch area.

* * * * *